(12) United States Patent
Mizohana et al.

(10) Patent No.: US 11,741,632 B2
(45) Date of Patent: Aug. 29, 2023

(54) SYSTEM, INFORMATION PROCESSING METHOD, METHOD OF MANUFACTURING PRODUCT, AND RECORDING MEDIUM WITH IMAGES OF OBJECT THAT MOVES RELATIVE TO CAMERAS BEING CAPTURED AT PREDETERMINED INTERVALS AND HAVING DIFFERENT IMAGE CAPTURE TIMES

(71) Applicant: CANON KABUSHIKI KAISHA, Tokyo (JP)

(72) Inventors: Hiroto Mizohana, Tokyo (JP); Keita Dan, Tokyo (JP); Kenkichi Yamamoto, Tokyo (JP); Kei Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/376,339

(22) Filed: Jul. 15, 2021

(65) Prior Publication Data

US 2022/0028117 A1 Jan. 27, 2022

(30) Foreign Application Priority Data

Jul. 22, 2020 (JP) .................................. 2020-124856

(51) Int. Cl.
*G06T 7/80* (2017.01)
*G06T 7/292* (2017.01)
(Continued)

(52) U.S. Cl.
CPC .............. *G06T 7/80* (2017.01); *G06T 1/0014* (2013.01); *G06T 7/0004* (2013.01); *G06T 7/292* (2017.01);
(Continued)

(58) Field of Classification Search
None
See application file for complete search history.

(56) References Cited

U.S. PATENT DOCUMENTS 5,760,762 A 6/1998 Yamamoto
6,335,746 B1 1/2002 Enokida et al.
(Continued)

FOREIGN PATENT DOCUMENTS

CN 111326012 A * 6/2020 ............... G06T 7/73
JP 2009-071732 A 4/2009
JP 2011-239379 A 11/2011

*Primary Examiner* — Stefan Gadomski
(74) *Attorney, Agent, or Firm* — Venable LLP

(57) ABSTRACT

A system includes an information processing device. The information processing device is configured to acquire an image group from each of a plurality of cameras. The image group includes a plurality of images of an object that moves relative to each of the plurality of cameras. The plurality of images are captured by a corresponding camera at predetermined intervals and having different image capture times. The information processing device is configured to calculate an amount of movement of the object relative to each of the plurality of cameras, based on the image group acquired from each of the plurality of cameras. The information processing device is configured to detect a lag between image capture timings of the plurality of cameras, by using the amount of movement of the object relative to each of the plurality of cameras.

17 Claims, 11 Drawing Sheets

(51) Int. Cl.
*G06T 7/00* (2017.01)
*H04N 17/00* (2006.01)
*G06T 1/00* (2006.01)
*H04N 23/90* (2023.01)
*H04N 23/695* (2023.01)

(52) U.S. Cl.
CPC ......... *H04N 17/002* (2013.01); *H04N 23/695* (2023.01); *H04N 23/90* (2023.01); *G06T 2207/30164* (2013.01)

(56) References Cited

U.S. PATENT DOCUMENTS

| | | | |
|---|---|---|---|
| 6,340,991 B1* | 1/2002 | Chen | H04N 13/239 348/E5.014 |
| 6,633,685 B1 | 10/2003 | Kusama et al. | |
| 6,704,466 B1 | 3/2004 | Yamamoto et al. | |
| 6,720,971 B1 | 4/2004 | Yamamoto et al. | |
| 6,724,946 B1 | 4/2004 | Kusama et al. | |
| 6,731,826 B1 | 5/2004 | Yamamoto et al. | |
| 6,813,394 B1 | 11/2004 | Matsumoto et al. | |
| 6,927,874 B1 | 8/2005 | Enokida et al. | |
| 7,321,687 B2 | 1/2008 | Yamamoto | |
| 7,567,708 B2 | 7/2009 | Yamamoto | |
| 7,809,732 B2 | 10/2010 | Kusama et al. | |
| 8,493,436 B2* | 7/2013 | Lyon | H04N 5/23203 348/47 |
| 2007/0073439 A1* | 3/2007 | Habibi | G05B 19/4182 700/213 |
| 2011/0102814 A1* | 5/2011 | Okamura | H04N 7/188 348/142 |
| 2011/0242413 A1* | 10/2011 | Azzopardi | H04N 5/247 348/E9.034 |
| 2011/0267433 A1 | 11/2011 | Thorpe et al. | |
| 2013/0314530 A1* | 11/2013 | Peterson | G01B 11/24 348/E5.042 |
| 2014/0286537 A1 | 9/2014 | Seki et al. | |
| 2014/0293268 A1* | 10/2014 | Lee | G01P 3/36 356/28 |
| 2015/0304629 A1* | 10/2015 | Zhang | H04N 13/20 348/48 |
| 2016/0307311 A1* | 10/2016 | Udo | G01B 11/005 |
| 2017/0078646 A1 | 3/2017 | Matsunobu et al. | |
| 2017/0106542 A1* | 4/2017 | Wolf | B25J 9/0081 |
| 2017/0147889 A1* | 5/2017 | Okano | G06V 20/588 |
| 2018/0202947 A1* | 7/2018 | Urano | G01N 23/18 |
| 2019/0225430 A1 | 7/2019 | Ooba | |
| 2019/0385324 A1 | 12/2019 | Kume et al. | |
| 2020/0021742 A1* | 1/2020 | Deng | G05B 19/0426 |
| 2020/0126204 A1 | 4/2020 | Watanabe | |
| 2020/0193633 A1* | 6/2020 | Sugiyama | G06T 7/292 |
| 2020/0267366 A1 | 8/2020 | Kido et al. | |
| 2020/0267372 A1* | 8/2020 | Taketani | H04N 13/239 |

* cited by examiner

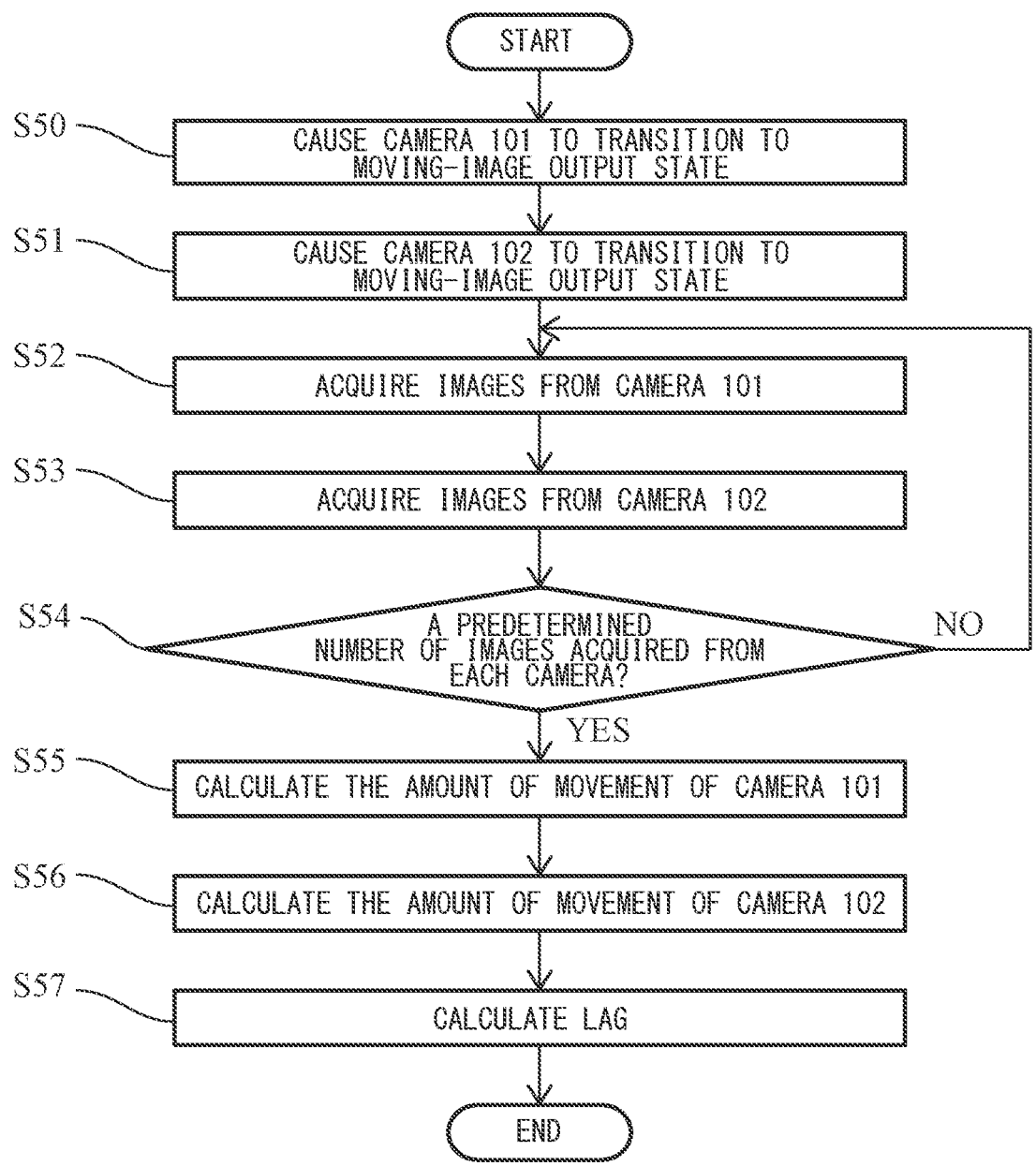

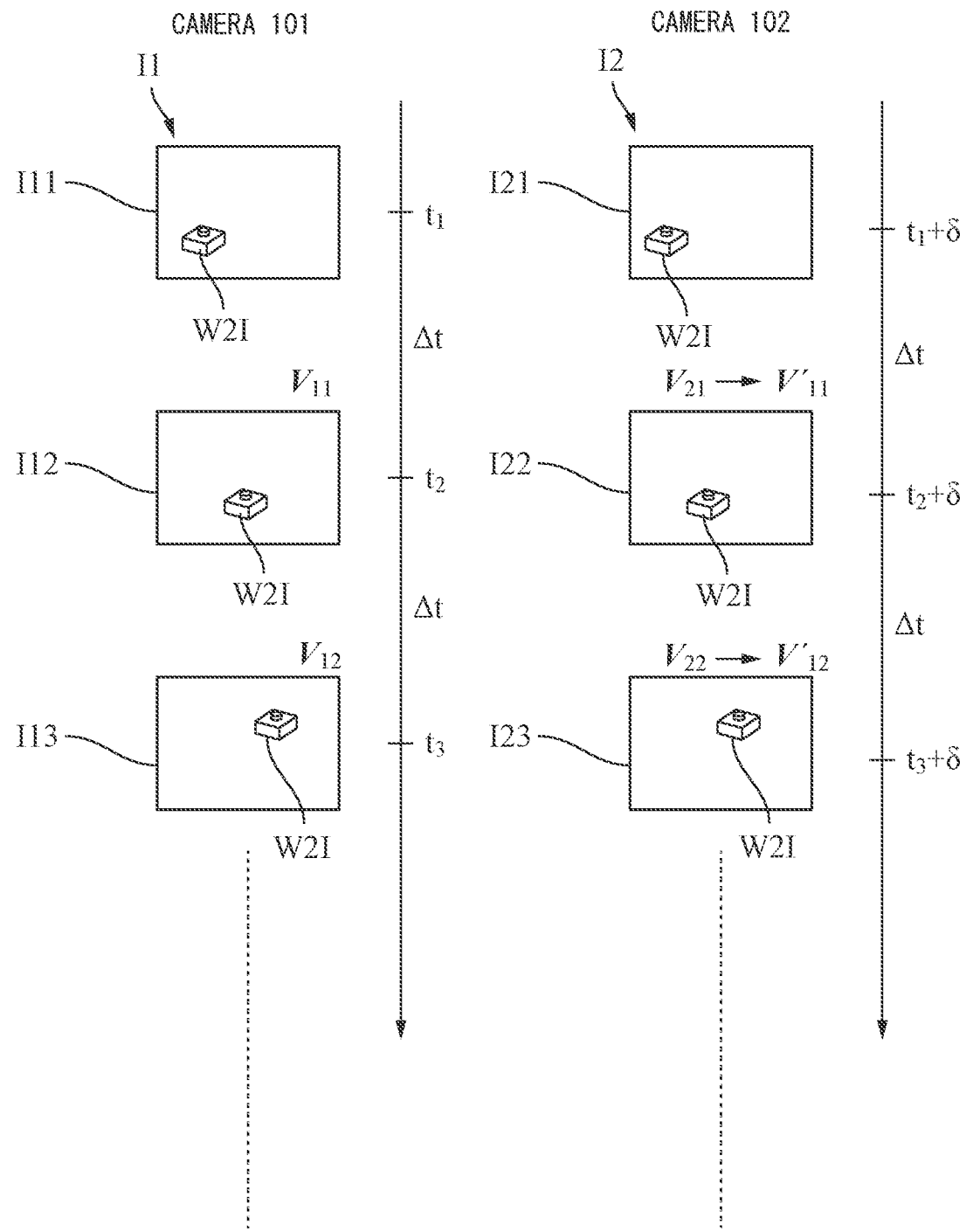

SYSTEM, INFORMATION PROCESSING METHOD, METHOD OF MANUFACTURING PRODUCT, AND RECORDING MEDIUM WITH IMAGES OF OBJECT THAT MOVES RELATIVE TO CAMERAS BEING CAPTURED AT PREDETERMINED INTERVALS AND HAVING DIFFERENT IMAGE CAPTURE TIMES

BACKGROUND OF THE INVENTION

Field of the Invention

The present invention relates to synchronization of a plurality of cameras.

Description of the Related Art

In a production line in which products are manufactured, production apparatuses including robots work in place of humans.

Such a production apparatus may include a camera and an image processing device for performing two-dimensional or three-dimensional measurement on a workpiece, for measuring or inspecting the workpiece in work. For example, in a case where information in a depth direction is required for measuring or inspecting a target object, a plurality of cameras is used for performing three-dimensional measurement on the target object by using the triangulation. In the three-dimensional measurement, images of the target object are captured by the plurality of cameras; and a difference, or a parallax, between a position of the target object in one image and a position of the target object in another image is calculated. The parallax is converted to a depth value, so that the three-dimensional information on the target object is obtained.

The three-dimensional measurement may be required to measure a target object accurately. However, in a case where the plurality of cameras and the target object move relative to each other, or the plurality of cameras or the target object vibrates, if the image capture timings of the plurality of cameras are shifted from each other, the parallax cannot be calculated accurately, and it becomes difficult to accurately measure the three-dimensional information of the target object. For this reason, it is required to accurately synchronize the image capture timings of the plurality of cameras.

Japanese Patent Application Publication No. 2011-239379 discloses a configuration that includes communication portions that allow one camera to control another camera for synchronizing the image capture timings of a plurality of cameras.

In Japanese Patent Application Publication No. 2011-239379, however, since a communication portion is provided in each of the plurality of cameras for sending or receiving a trigger signal, each camera is increased in size and price. Specifically, a transmitting circuit to transmit a trigger signal and a receiving circuit to receive a trigger signal are additionally required for each camera. In addition, a cable that serves as a transmission line of the trigger signal and that connects one camera with another camera is also required additionally. Thus, it has been desired to accurately detect the lag between the image capture timings of the plurality of cameras in a configuration in which no communication portions are provided.

SUMMARY OF THE INVENTION

According to a first aspect of the present invention, a system includes an information processing device. The information processing device is configured to acquire an image group from each of a plurality of cameras. The image group includes a plurality of images of an object that moves relative to each of the plurality of cameras. The plurality of images are captured by a corresponding camera at predetermined intervals and having different image capture times. The information processing device is configured to calculate an amount of movement of the object relative to each of the plurality of cameras, based on the image group acquired from each of the plurality of cameras. The information processing device is configured to detect a lag between image capture timings of the plurality of cameras, by using the amount of movement of the object relative to each of the plurality of cameras.

According to a second aspect of the present invention, a processing portion performs an information processing method. The method includes acquiring, by the processing portion, an image group from each of a plurality of cameras. The image group includes a plurality of images of an object that moves relative to each of the plurality of cameras. The plurality of images are captured by a corresponding camera at predetermined intervals and have different image capture times. The method includes calculating, by the processing portion, an amount of movement of the object relative to each of the plurality of cameras, based on the image group acquired from each of the plurality of cameras. The method includes detecting, by the processing portion, a lag between image capture timings of the plurality of cameras, by using the amount of movement of the object relative to each of the plurality of cameras.

According to a third aspect of the present invention, a processing portion performs an information processing method. The method includes acquiring, by the processing portion, an image group from each of a plurality of cameras. The image group includes a plurality of images of an object that moves relative to each of the plurality of cameras. The plurality of images are captured by a corresponding camera at predetermined intervals and have different image capture times. The method includes calculating, by the processing portion, an amount of movement of the object relative to each of the plurality of cameras, based on the image group acquired from each of the plurality of cameras. The method includes controlling, by the processing portion, at least one of the plurality of cameras based on the amount of movement of the object relative to each of the plurality of cameras.

Further features of the present invention will become apparent from the following description of exemplary embodiments with reference to the attached drawings.

BRIEF DESCRIPTION OF THE DRAWINGS

FIG. 6 is a flowchart illustrating a procedure of a detection process included in an information processing method of the first embodiment.

FIG. 7 is a diagram illustrating one example of images outputted from each camera of the first embodiment.

DESCRIPTION OF THE EMBODIMENTS

Hereinafter, some embodiments of the present invention will be described in detail with reference to the accompanying drawings.

First Embodiment

Figure 1A:
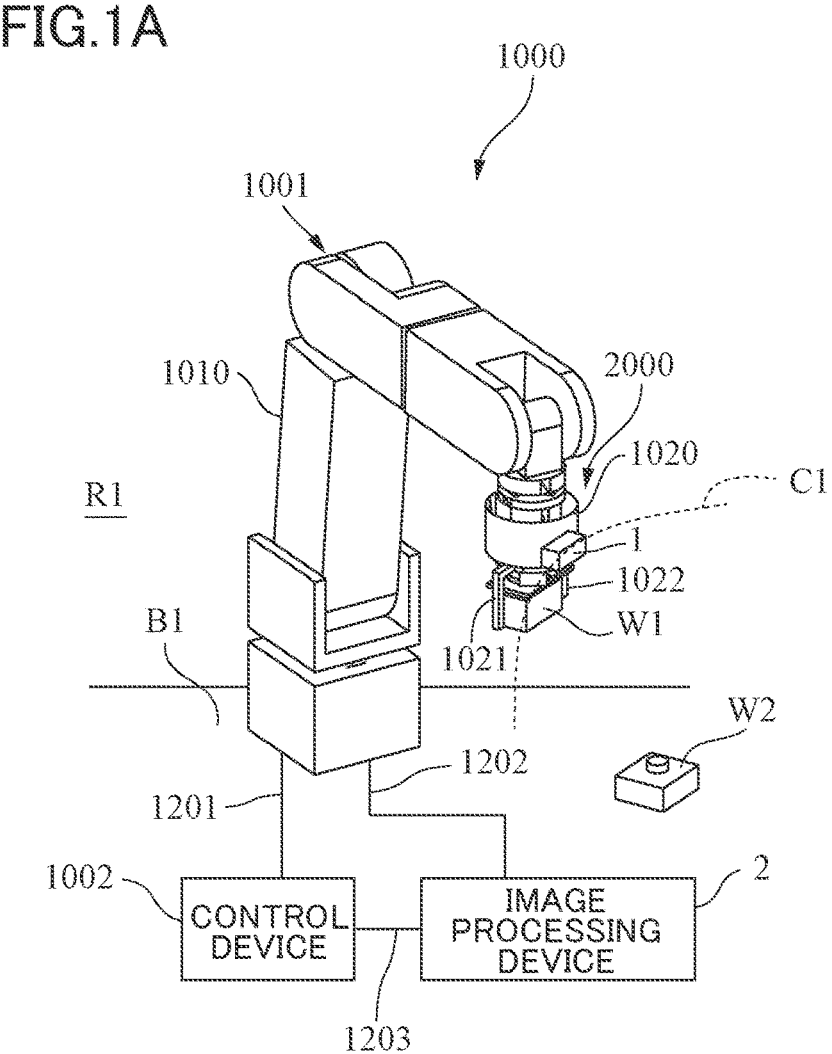
FIG. 1A is a schematic diagram of a robot system that is one example of a manufacturing system of a first embodiment.

FIG. 1A is a schematic diagram of a robot system 1000 that is one example of a manufacturing system of a first embodiment. The robot system 1000 is disposed in a production line, and is used as a manufacturing system that manufactures a product by assembling a workpiece W1 to a workpiece W2. The robot system 1000 includes a robot device 1001, a control device 1002, and an image capture system 2000. The robot device 1001 is one example of a driving device. The image capture system 2000 includes an image capture device 1, and an image processing device 2 that is one example of an information processing device. The space in which the robot device 1001 is disposed is a work space R1.

The robot device 1001 is installed on a stand B1. The robot device 1001 includes a robot arm 1010, and a robot hand 1020 that is one example of end effectors. In the present embodiment, the robot arm 1010 is an articulated robot arm. Specifically, the robot arm 1010 is a vertically articulated robot arm. The robot hand 1020 is attached to a predetermined portion of the robot arm 1010, such as a distal end portion of the robot arm 1010. The robot arm 1010 can move the robot hand 1020 to a freely-selected position. The robot hand 1020 has a plurality of (e.g., two) fingers 1021 and 1022, and can hold an object such as the workpiece W1.

The control device 1002 is communicatively connected to the robot device 1001 via a cable 1201; and can control the robot device 1001, that is, the robot arm 1010 and the robot hand 1020.

In the present embodiment, the image capture device 1 is a stereo camera. The image capture device 1 is connected with the image processing device 2 via a cable 1202. The cable 1202 includes a power line, a communication line, and an I/O line. The communication line is used to transmit or receive image capture data or image capture parameters, and the I/O line is used for communication control and the like. The interface of the communication line is based on specifications, such as the USB (universal serial bus) standards.

Figure 1B:
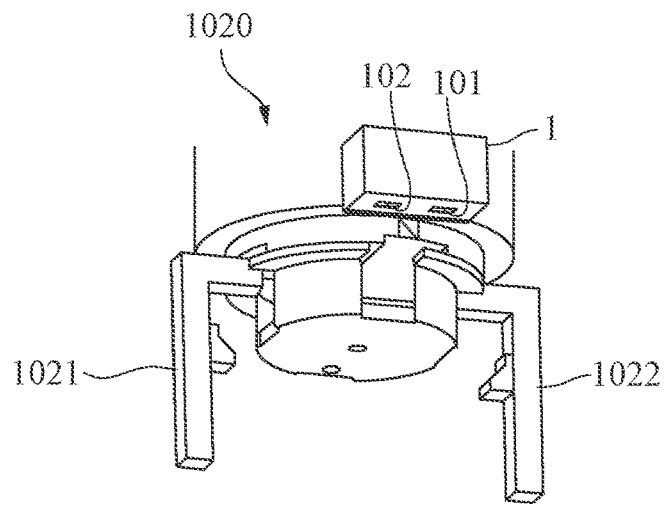
FIG. 1B is a perspective view of a robot hand and an image capture device of the first embodiment.

In the present embodiment, the image capture device 1 is attached to the robot device 1001. For example, the image capture device 1 is attached to the robot hand 1020. Thus, the image capture device 1 is supported by the robot device 1001. FIG. 1B is a perspective view of the robot hand 1020 and the image capture device 1. The image capture device 1 includes a plurality of (two in the first embodiment) cameras 101 and 102. In the present embodiment, the position and posture of the robot hand 1020 of the robot device 1001 is controlled, depending on a result of three-dimensional measurement performed on an object, such as the workpiece W2, by using the image capture device 1. Note that although the image capture device 1 is a stereo camera in the present embodiment, the image capture device 1 may be a multi-view camera that includes a plurality of cameras. The multi-view camera can produce a free viewpoint video by causing the plurality of cameras to capture images of an object.

Each of the cameras 101 and 102 is a monocular camera. The two cameras 101 and 102 are disposed, separated from each other such that the optical axes of the cameras for capturing images are separated from each other by a predetermined baseline length. Each of the cameras 101 and 102 captures an image of an object, and produces image data. The image data is transmitted to the image processing device 2 via the above-described communication interface.

The image processing device 2 can set image capture parameters to the image capture device 1 via the above-described communication interface. The image capture parameters are setting information used when images are captured. The image capture parameters include parameters related to exposure time, gain, image size, and the like.

The image processing device 2 is communicatively connected with the control device 1002 via a cable 1203. In the present embodiment, the image capture device 1 is attached to the robot device 1001. For example, the image capture device 1 is attached to the robot hand 1020, and is used for performing three-dimensional measurement on an object such as the workpiece W2. In such a configuration, the image processing device 2 uses the image capture device 1, and performs three-dimensional measurement on an object such as the workpiece W2. In addition, the control device 1002 controls the robot device 1001 based on the measurement result, and causes the robot device 1001 to perform production work, such as assembling the workpiece W1 to the workpiece W2.

Figure 2A:
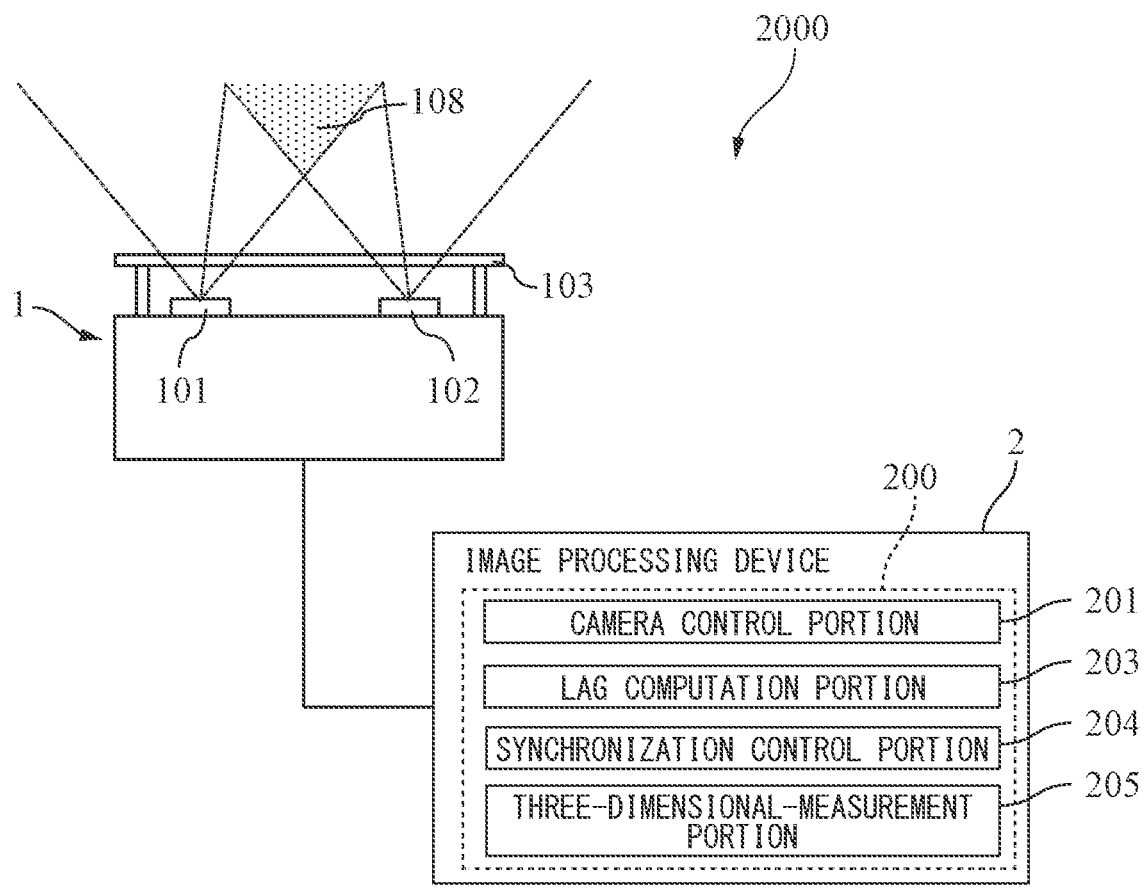
FIG. 2A is a diagram illustrating an image capture system of the first embodiment.
Figure 2B:
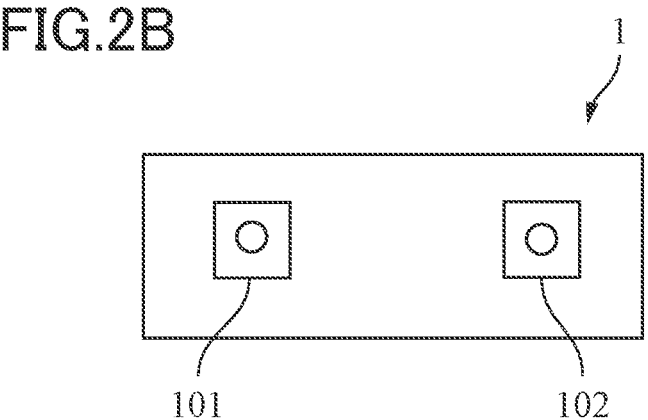
FIG. 2B is a front view of the image capture device of the first embodiment.

FIG. 2A is a diagram illustrating the image capture system 2000 of the first embodiment. FIG. 2B is a front view of the image capture device 1. As described above, the image capture device 1 includes the cameras 101 and 102, which are disposed separated from each other such that the optical axes of the cameras for capturing images are separated from each other by a predetermined baseline length. In front of the cameras 101 and 102, a board 103 is disposed. Note that in positions of the board 103 that face the cameras 101 and 102, opening portions are formed so that the board 103 does not block the field of view of each of the cameras 101 and 102. On the front surface of the board 103, an illumination device (not illustrated) may be disposed for the three-dimensional measurement. The illumination device (not illustrated) may be a pattern floodlight.

Afield in which the field of view of the camera 101 overlaps with the field of view of the camera 102 is a common field of view 108 of the plurality of cameras 101 and 102. By capturing an image of an object, such as the workpiece W2, that exists in the common field of view 108, the three-dimensional measurement can be performed on the workpiece W2.

Each of the cameras 101 and 102 of the present embodiment is a relatively small and inexpensive camera, such as a camera module for portable devices or a WEB camera. In the present embodiment, each of the cameras 101 and 102 is a product that can be available as a single unit. The cameras 101 and 102 are incorporated into a housing, so that the image capture device 1 is made. The cameras 101 and 102 are positioned by the housing with respect to each other, such that the cameras 101 and 102 are separated from each other by a predetermined baseline length. In the present embodiment, since the cameras 101 and 102 do not need the synchronizing function, such as a genlock function, that synchronizes the cameras 101 and 102 with an external synchronizing signal, and the time stamp function that outputs an image capture time, the cameras 101 and 102 do not have the synchronizing function and the time stamp function. In the present embodiment, the image capture device 1 can be made in the above-described manner, with the units of the cameras 101 and 102, which are easily available and relatively inexpensive.

The image processing device 2 illustrated in FIG. 2A is a computer that performs computing process, and has hardware including a CPU, a storage portion, and an interface (I/F) portion. The storage portion includes a ROM and a RAM, and the interface (I/F) portion communicates with an external device. The CPU of the image processing device 2 functions as a processing portion 200 that performs image processing, by executing a program. The processing portion 200 includes, as functions, a camera control portion 201, a lag computation portion 203, a synchronization control portion 204, and a three-dimensional-measurement portion 205. The processing portion 200 also includes a function to control the image capture device 1, in addition to the image processing function.

Figure 3:
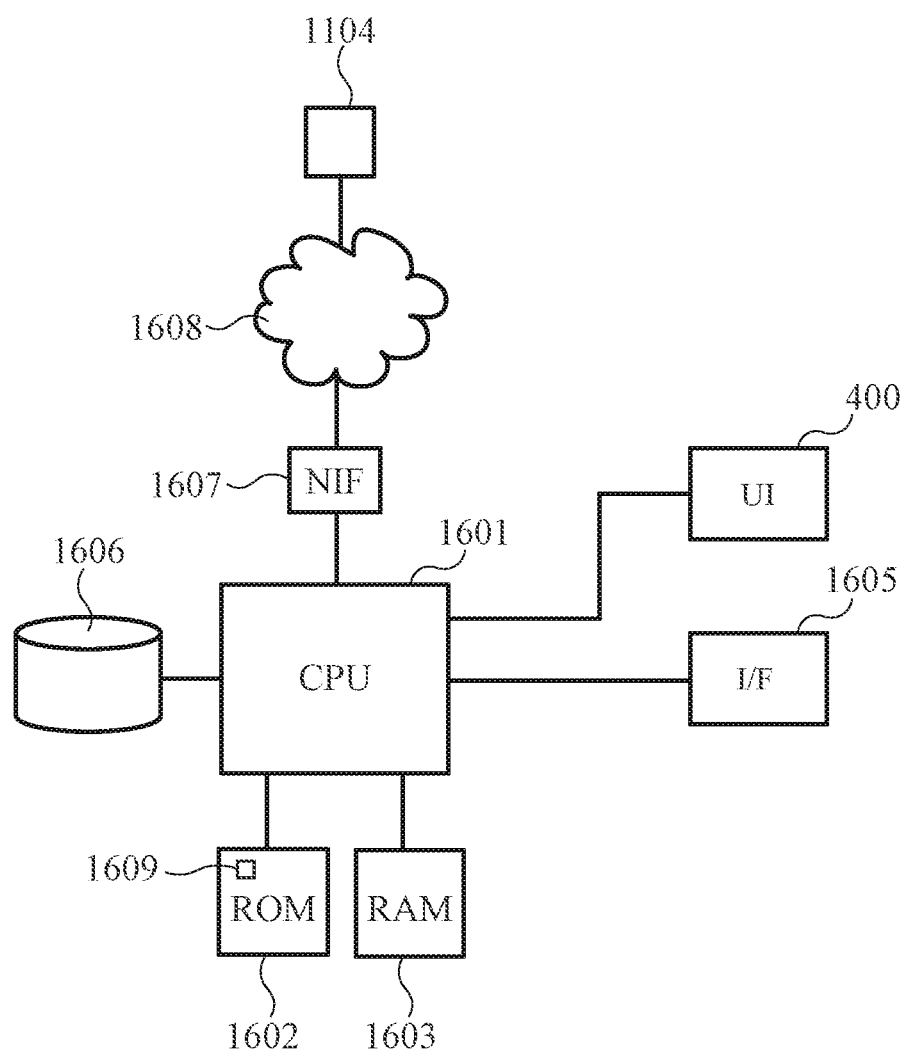
FIG. 3 is a diagram illustrating a control system of an image processing device of the first embodiment.

FIG. 3 is a diagram illustrating a control system of the image processing device 2 of the first embodiment. With reference to FIG. 3, one example of a specific hardware configuration of the control system of the image processing device 2 will be described. The control system illustrated in FIG. 3 includes a CPU 1601 that is a processor, a ROM 1602, and a RAM 1603. In addition, a storage device 1606 is connected to the control system illustrated in FIG. 3.

Functions of the portions 201, 203, 204, and 205 of the processing portion 200 illustrated in FIG. 2A are achieved by the CPU 1601, the hardware around the CPU 1601, and a program 1609 executed by the CPU 1601, which are illustrated in FIG. 3. A storage portion used for the image processing and the image capture control includes the ROM 1602, the RAM 1603, and the storage device 1606.

The ROM 1602 stores the program 1609, information on constants, and the like. The RAM 1603 is used as a work area used by the CPU 1601. The storage device 1606 is a storage device, such as an HDD or an SSD. The storage device 1606 may be an internal storage device, an external storage device connected to the CPU 1601 via the USB interface or the like, or an external storage device mounted in a network.

In the present embodiment, the ROM 1602 is a computer-readable non-transitory recording medium that stores the program 1609. The program 1609 may be supplied to the ROM 1602 via a network interface 1607, or via a disk drive (not illustrated). In addition, the program 1609 stored in the ROM 1602 may be updated by an update program.

Note that the recording medium that stores the program 1609 is not limited to the ROM 1602. The recording medium that stores the program 1609 may be a recording disk, such as a magnetic disk or an optical disk, or may be a memory device such as a flash memory.

The network interface 1607 can be achieved by using wire-communication standards such as IEEE 802.3, or wireless-communication standards such as IEEE 802.11 or 802.15. The CPU 1601 can communicate with another device 1104 via the network interface 1607 and a network 1608.

For example, if the image capture device 1 is connected to the network, the device 1104 illustrated in FIG. 3 corresponds to the image capture device 1. If the image capture device 1 is connected to the CPU 1601 under standards other than the network-connection standards, an interface 1605 may be used. The interface 1605 may be used for connecting the CPU 1601 and a peripheral device other than the image capture device 1.

In addition, the control system of FIG. 3 may be provided with a user interface device (UI device) 400, as necessary. The user interface device 400 may be a GUI device including an LCD display, a keyboard, and a pointing device. The pointing device is a mouse, a joystick, or a jog dial, for example.

The user interface device 400 may be used for displaying a captured image, notifying a user of the progress and the result of each of the synchronizing process and the three-dimensional measurement, and setting control constants related to the image capture parameters and the synchronization.

Note that although the function of the processing portion 200 is achieved, in the present embodiment, by the CPU 1601 reading and executing the program 1609, the present disclosure is not limited to this. For example, the image processing device 2 may include an FPGA, and the function of the processing portion 200 may be achieved by a hardware block of the FPGA.

Figure 4:
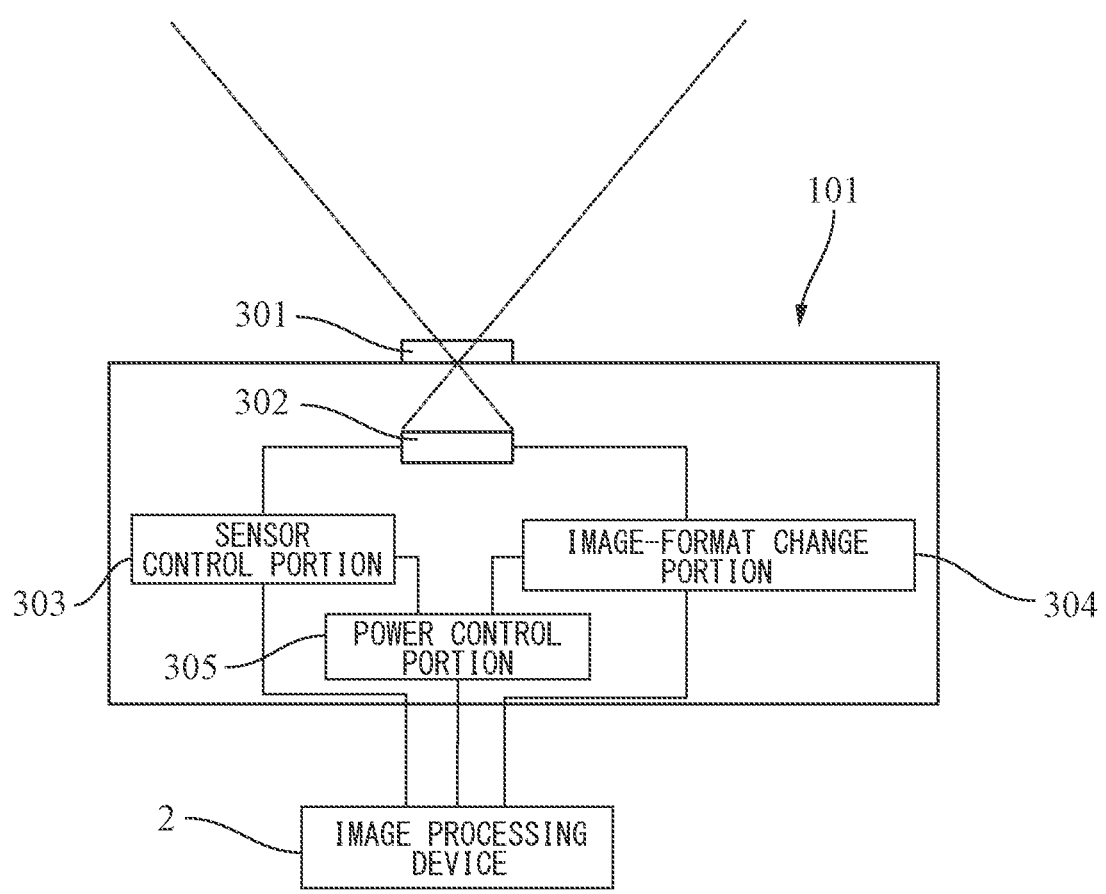
FIG. 4 is a schematic diagram illustrating an internal configuration of a camera of the first embodiment.

FIG. 4 is a schematic diagram illustrating an internal configuration of the camera 101. Note that since the configuration of the camera 102 is the same as the configuration of the camera 101, the description thereof will be omitted. The camera 101 includes a light-condensing portion 301, an image sensor 302, a sensor control portion 303, an image-format change portion 304, and a power control portion 305.

The light-condensing portion 301 includes a lens that constitutes an image-capture optical system. The image-capture optical system condenses light, and sends the light to the image sensor 302.

The image sensor 302 is an image pickup device. For example, the image sensor 302 is a CCD (charge coupled device) image sensor, or a CMOS (complementary metal oxide semiconductor) image sensor.

Hereinafter, an outline of operations of the portions 201, 203, 204, and 205 of the image processing device 2 illustrated in FIG. 2A will be described.

First, operations of the camera control portion 201 will be described. Note that since the camera control portion 201 can control the cameras 101 and 102 individually, and the control of the camera 102 is the same as that of the camera 101, the control of the camera 101 will be described below.

The camera control portion 201 transmits a power supply instruction to the camera 101. With this operation, power is supplied to the image sensor 302 of the camera 101.

Then, the camera control portion 201 transmits an initializing instruction to the camera 101. After the initialization of the image sensor 302 of the camera 101 is completed, the camera control portion 201 transmits an image-capture-parameter change instruction to the camera 101 for changing image capture parameters. The image capture parameters include parameters related to exposure time, gain, image size, and the like. The image capture parameters may further include a parameter related to a focal length if the optical system needs the parameter.

When the adjustment of the image capture parameters is completed, the camera control portion 201 transmits a moving-image output start instruction to the camera 101, and causes the camera 101 to output moving images. If the camera control portion 201 receives an image acquisition instruction from the lag computation portion 203, the camera control portion 201 extracts still-image data from moving-image data, and acquires the still-image data.

In addition, the camera control portion 201 transmits a moving-image output stop instruction to the camera 101 for causing the image sensor 302 to stop outputting moving images. With this operation, the power supply to the image sensor 302 is stopped, and the camera 101 stops outputting moving images.

The camera control portion 201 can cause the camera 101 to output moving images again by transmitting the power supply instruction, the initializing instruction, the image-capture-parameter change instruction, and the moving-image output start instruction again. In this manner, the camera control portion 201 can control the moving-image output start timing of the camera 101.

The lag computation portion 203 performs a detection process that detects a lag between the image capture timings of the cameras 101 and 102. The detection process will be described in detail later. The synchronization control portion 204 performs a synchronizing process in accordance with the lag detected by the lag computation portion 203. The synchronizing process will be described later.

The three-dimensional-measurement portion 205 performs three-dimensional measurement on an object by using images of the object captured by the cameras 101 and 102. Specifically, the three-dimensional-measurement portion 205 calculates three-dimensional-position information of the object, depending on the triangulation, by using a parallax, internal parameters, and external parameters. The parallax is calculated by performing a stereo matching process, and the internal parameters and the external parameters are determined by performing a stereo camera calibration.

In the stereo matching process, an image captured by the camera 101 is defined as a reference image, and pixels of an image captured by the camera 102 that correspond to pixels of the reference image that correspond to a predetermined portion of the object, that is, pixels of the image captured by the camera 102 that correspond to the predetermined portion of the object are determined by performing matching. As the stereo matching process, block matching methods, such as SAD (sum of absolute difference) and SSD (sum of squared difference), are known. Such a stereo matching process can be used also in the present embodiment.

The internal parameters represent optical properties, such as a focal length and distortion properties of each lens. The external parameters represent a relative position and a relative posture of the two cameras of the stereo camera. The internal parameters and the external parameters can be calculated in advance by capturing an image of a calibration chart whose shape is known, and by using the optimizing method. The internal parameters and the external parameters of the cameras 101 and 102 calculated in advance are stored in the ROM 1602 of the image processing device 2, for example.

Note that although the image processing device 2 is separated from the image capture device 1 in the present embodiment, the present disclosure is not limited to this. For example, the image processing device 2 may be incorporated in the image capture device 1, as in a smart camera.

Next, an outline of the portions 303 to 305 of the camera 101 illustrated in FIG. 4 will be described. The sensor control portion 303, the image-format change portion 304, and the power control portion 305 are an electronic circuit that includes an FPGA, a memory portion, and an interface (I/F) portion. The memory portion includes a ROM and a RAM, and the interface (I/F) portion communicates with an external device. The sensor control portion 303, the image-format change portion 304, the power control portion 305, and the image sensor 302 are electrically connected with each other.

Figure 5:
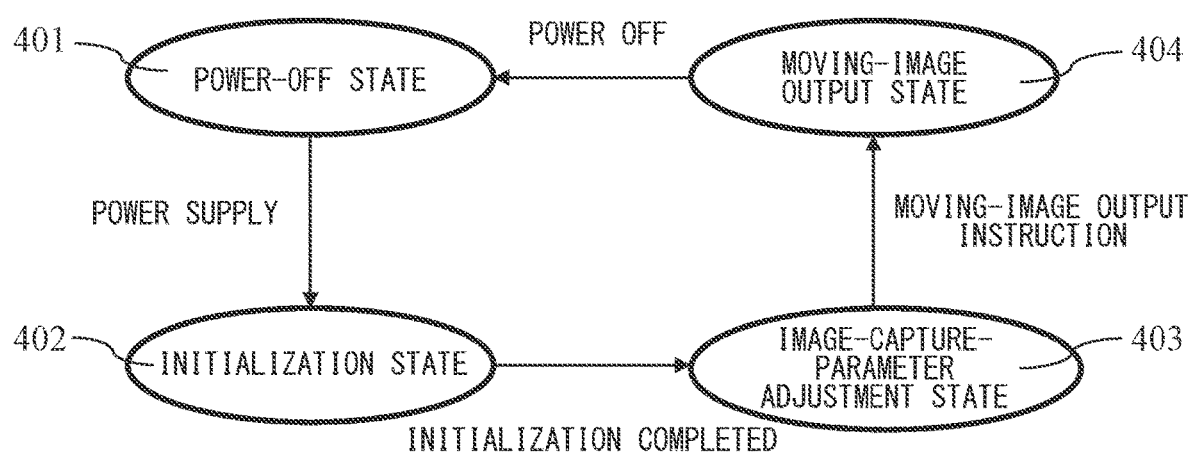
FIG. 5 is a schematic diagram illustrating state transitions of an image sensor of the first embodiment.

The sensor control portion 303 communicates with the camera control portion 201 of the image processing device 2, and controls the state transition of the image sensor 302. FIG. 5 is a schematic diagram illustrating the state transition of the image sensor 302 of the first embodiment.

As illustrated in FIG. 5, the image sensor 302 changes its state in the order of a power-off state 401, an initialization state 402, an image-capture-parameter adjustment state 403, and a moving-image output state 404. Thus, the image sensor 302 transitions to any one of the four states.

The power-off state 401 is a state in which the image sensor 302 is not supplied with power. Upon receiving the power supply instruction from the camera control portion 201 of the image processing device 2, the sensor control portion 303 supplies power to the image sensor 302. When the power is supplied to the image sensor 302, the image sensor 302 transitions to the initialization state 402.

The initialization state 402 is a state in which the image sensor 302 is initialized. First, the sensor control portion 303 sends clock signals to the image sensor 302. Upon receiving the initializing instruction from the camera control portion 201 of the image processing device 2, the sensor control portion 303 transmits an initializing signal to the image sensor 302. With this operation, the image sensor 302 is initialized. After the initialization of the image sensor 302 is completed, the sensor control portion 303 and the image sensor 302 can communicate with each other, and the image sensor 302 transitions to the image-capture-parameter adjustment state 403.

The image-capture-parameter adjustment state 403 is a state in which the sensor control portion 303 can adjust the image capture parameters of the image sensor 302. The image capture parameters include parameters related to exposure time, gain, image size, and the like. Upon receiving the image-capture-parameter change instruction from the camera control portion 201 of the image processing device 2 in the image-capture-parameter adjustment state 403, the sensor control portion 303 sends a control command to the image sensor 302, for example. With this operation, a value of a register in which the image capture parameters are stored is rewritten in the image sensor 302.

Upon receiving the moving-image output start instruction from the camera control portion 201 of the image processing device 2, the sensor control portion 303 transmits a moving-image output start signal to the image sensor 302, and causes the image sensor 302 to transition to the moving-image output state 404.

The moving-image output state 404 is a state in which the image sensor 302 continues to output moving-image data to the image-format change portion 304. If the sensor control portion 303 receives, in this state, the moving-image output stop instruction from the camera control portion 201 of the image processing device 2, the sensor control portion 303 stops supplying power to the image sensor 302, so that the image sensor 302 stops outputting moving images to the image-format change portion 304. With this operation, the image sensor 302 transitions to the power-off state 401.

If the camera control portion 201 transmits the power supply instruction again to the sensor control portion 303 after the image sensor 302 transitions to the power-off state 401, the camera 101 is restarted. Thus, the camera control portion 201 can cause the image sensor 302 to transition to each of the states 401 to 404 in a circulative manner, by sending instructions to the sensor control portion 303. In this manner, the camera control portion 201 of the image processing device 2 can control the moving-image output start timing of the camera 101, that is, can reset the image capture timing of the camera 101. The camera 102 has the same configuration as that of the camera 101. Thus, the camera control portion 201 of the image processing device 2 can control the moving-image output start timing of the camera 102, that is, can reset the image capture timing of the camera 102.

Note that although the above description has been made for the case where the image sensor 302 transitions from the moving-image output state 404 to only the power-off state 401, the present disclosure is not limited to this. If the image sensor 302 has a function to transition from the moving-image output state 404 to the initialization state 402, the image sensor 302 may transition from the moving-image output state 404 to the initialization state 402. That is, the camera control portion 201 of the image processing device 2 can reset the image capture timing of the camera 101 without stopping power supply to the image sensor 302. Similarly, the camera control portion 201 of the image processing device 2 can reset the image capture timing of the camera 102 without stopping power supply to the image sensor 302.

In addition, also in a case where the image sensor 302 has a moving-image capture mode and a still-image capture mode, and has a function to switch the image capture mode, the camera control portion 201 of the image processing device 2 can reset the image capture timing of the camera 101 or 102 without stopping power supply to the image sensor 302. That is, the image sensor 302 starts to output moving images if the image capture mode is switched from the still-image capture mode to the moving-image capture mode, and stops outputting moving images if the image capture mode is switched from the moving-image capture mode to the still-image capture mode. Thus, in such a configuration, the camera control portion 201 can reset the image capture timing of the camera 101 or 102 by switching the image capture mode between the moving-image capture mode and the still-image capture mode, without stopping power supply to the image sensor 302. Note that the image capture timings of each of the cameras 101 and 102 are predetermined intervals at which images are captured, and are set depending on a moving-image output start timing. Thus, resetting the image capture timings means resetting the moving-image output start timing. That is, the image capture timings can be reset by resetting the moving-image output start timing.

The control interface between the image sensor 302 and the sensor control portion 303 may be I/O terminals and an I2C (inter-integrated circuit). The format of images sent to the sensor control portion 303 is a RAW image format that conforms to MIPI CSI-2 (mobile industry processor interface camera serial interface-2). However, the specifications of the image sensor 302 and the format of output images are not limited to these, and can be selected freely.

The image-format change portion 304 has a function to change the format of RAW images sent from the image sensor, into a format of images to be sent to the image processing device 2. The format of images supported by the image-format change portion 304 may be a format that conforms to the UVC (USB Video Class). However, the image-format change portion 304 may support another format of images other than the UVC.

In the present embodiment, the cameras 101 and 102 operate when power is supplied from the image processing device 2. The power control portion 305 has a function to supply power to the sensor control portion 303 and the image-format change portion 304 when the power control portion 305 is supplied with power from the image processing device 2. As described above, the control of power supply to the image sensor 302 is performed by the sensor control portion 303.

Each of the cameras 101 and 102 outputs moving images at a predetermined frame rate. That is, each of the cameras 101 and 102 can capture images of an object at image capture intervals serving as the predetermined intervals. However, the cameras 101 and 102 operate independently. That is, both of the cameras 101 and 102 operate without receiving any trigger signal used for synchronization. Thus, the image capture timings of the camera 101 may not be the same as the image capture timings of the camera 102. In addition, the image capture intervals of each of the cameras 101 and 102 may have an error. Furthermore, an error may occur between the image capture intervals of the camera 101 and the image capture intervals of the camera 102. These errors are allowed when images are captured. However, even if the image capture timings of the camera 101 are the same as the image capture timings of the camera 102 in an early stage of use, the image capture timings of the camera 101 and the image capture timings of the camera 102 may be gradually shifted from each other as the period of use of the cameras 101 and 102 becomes longer. In the present embodiment, the image processing device 2 detects the lag between the image capture timings of the plurality of cameras 101 and 102. Note that in the present embodiment, detecting the lag has the same meaning as calculating the lag.

Hereinafter, a method of calculating the lag between the image capture timings of the cameras 101 and 102 of the present embodiment, that is, an information processing method performed by the image processing device 2 will be described. FIG. 6 is a flowchart illustrating a procedure of a detection process included in the information processing method of the first embodiment. FIG. 7 is a diagram illustrating one example of images outputted from each of the cameras 101 and 102.

The processing portion 200 illustrated in FIG. 2A performs a detection process in which the lag between the image capture timings of the plurality of cameras 101 and 102 is detected. That is, the lag detection process, or the lag calculation process, is performed by the processing portion 200, that is, by the lag computation portion 203. The below-described object whose images are captured by the cameras 101 and 102 may be any object as long as features of the object can be extracted from the images. In the present embodiment, the object is the workpiece W2 which is illustrated in FIG. 1A, and on which the three-dimensional measurement is performed. The workpiece W2 does not move in the work space R1 in a period of time in which images of the workpiece W2 are captured by the image capture device 1 for detecting the lag. The image capture device 1 is moved along a nonlinear line C1, with respect to the workpiece W2.

As illustrated in FIGS. 1A and 1B, in the present embodiment, the image capture device 1 is attached to the robot hand 1020. Thus, the image capture device 1 can be moved with respect to the workpiece W2 in the work space R1, by moving the robot hand 1020 in the work space R1. The image capture device 1 is moved with respect to the workpiece W2 such that the workpiece W2 is present in the common field of view 108 (FIG. 2A) of the cameras 101 and 102. In the present embodiment, the image capture device 1 is moved nonlinearly by the robot device 1001.

In Step S50, the lag computation portion 203 causes the image sensor 302 of the camera 101 to transition to the moving-image output state 404. Specifically, the lag computation portion 203 instructs the camera control portion 201 to send the moving-image output start instruction to the camera 101. With this operation, the camera control portion 201 transmits the moving-image output start instruction to the camera 101, so that the camera 101 transitions to the moving-image output state 404 and starts to output moving images. As a result, the lag computation portion 203 can acquire the moving images captured by the camera 101, from the camera 101.

In Step S51, the lag computation portion 203 causes the image sensor 302 of the camera 102 to transition to the moving-image output state 404. Specifically, the lag computation portion 203 instructs the camera control portion 201 to send the moving-image output start instruction to the camera 102. With this operation, the camera control portion 201 transmits the moving-image output start instruction to the camera 102, so that the camera 102 transitions to the moving-image output state 404 and starts to output moving images. As a result, the lag computation portion 203 can acquire the moving images captured by the camera 102, from the camera 102.

In Step S52, the lag computation portion 203 acquires the images captured by the camera 101. Specifically, the lag computation portion 203 sends an image acquisition instruction to the camera control portion 201, extracts still-image data from moving-image data outputted from the camera 101, and acquires the still-image data.

In Step S53, the lag computation portion 203 acquires the images captured by the camera 102. Specifically, the lag computation portion 203 sends an image acquisition instruction to the camera control portion 201, extracts still-image data from moving-image data outputted from the camera 102, and acquires the still-image data.

In Step S54, the lag computation portion 203 determines whether to acquire a predetermined number of images (i.e., still images) from each of the cameras 101 and 102. If the lag computation portion 203 has not acquired the predetermined number of images (S54: NO), then the lag computation portion 203 returns to Step S52. In this manner, the lag computation portion 203 repeats the steps S52 and S53 until the lag computation portion 203 acquires the predetermined number of images. The predetermined number of images acquired by the lag computation portion 203 is at least three. Hereinafter, the steps S52 to S54 will be described with reference to FIG. 7, for a case where the predetermined number of images acquired by the lag computation portion 203 is three.

Images I11, I12, and I13 are acquired in this order from the camera 101. The plurality of images I11, I12, and I13 constitute an image group I1. In addition, images I21, I22, and I23 are acquired in this order from the camera 102. The plurality of images I21, I22, and I23 constitute an image group I2. The images I11, I12, and I13 are successively acquired in time series at image capture intervals Δt [ms], from moving-image data outputted from the camera 101. The images I21, I22, and I23 are successively acquired in time series at image capture intervals Δt [ms], from moving-image data outputted from the camera 102.

The images I11, I12, and I13 are respectively captured at different image capture times $t_1$, $t_2$, and $t_3$. The image capture intervals Δt [ms] of the camera 101 are constant, or are nearly constant and contains an error. Preferably, the error is within ±10% of a reference interval. The reference interval may be one sampled from among a series of image capture intervals of the camera 101, or may be an average value, a median value, a maximum value, or a minimum value of a plurality of (e.g., ten) image capture intervals sampled. In another case, the reference interval may be a design value. More preferably, the error is within ±2% of the reference interval, and still more preferably, the error is within +1% of the reference interval.

Similarly, the images I21, I22, and I23 are respectively captured at different image capture times $t_1+\delta$, $t_2+\delta$, and $t_3+\delta$. The image capture intervals Δt [ms] of the camera 102 are constant, or are nearly constant and contains an error. Preferably, the error is within ±10% of a reference interval. The reference interval may be one sampled from among a series of image capture intervals of the camera 102, or may be an average value, a median value, a maximum value, or a minimum value of a plurality of (e.g., ten) image capture intervals sampled. In another case, the reference interval may be a design value. More preferably, the error is within ±2% of the reference interval, and still more preferably, the error is within ±1% of the reference interval. The time δ [ms] is a lag between the image capture timings of the cameras 101 and 102, which is calculated in the following step.

The image capture intervals Δt of the camera 101 are the same as the image capture intervals Δt of the camera 102, or are nearly the same as the image capture intervals Δt of the camera 102. In the latter case, an error occurs between the image capture intervals Δt of the camera 101 and the image capture intervals Δt of the camera 102. Preferably, the error is within ±10% of a reference interval. The reference interval may be one sampled from among a series of image capture intervals of the camera 101 or 102, or may be an average value, a median value, a maximum value, or a minimum value of a plurality of (e.g., ten) image capture intervals sampled from among a series of image capture intervals of the camera 101 or 102. In another case, the reference interval may be a design value. More preferably, the error is within ±2% of the reference interval, and still more preferably, the error is within ±1% of the reference interval.

As described above, in the steps S50 to S54, the lag computation portion 203 acquires the image group I1 from the camera 101. The image group I1 is produced by the camera 101 capturing images of the workpiece W2, which moves relative to the camera 101, at the image capture intervals Δt. Similarly, in the steps S50 to S54, the lag computation portion 203 acquires the image group I2 from the camera 102. The image group I2 is produced by the camera 102 capturing images of the workpiece W2, which moves relative to the camera 102, at the image capture intervals Δt.

Next, in Step S55, the lag computation portion 203 calculates a movement of the camera 101 from the images I11 to I13. Since the workpiece W2 moves relative to the camera 101 when viewed from the camera 101, pixels W2I that correspond to the workpiece W2 move in the images I11 to I13. Thus, in Step S55, the lag computation portion 203 calculates the amount of movement of the workpiece W2 relative to the camera 101, as the movement of the camera 101, from the movement of the pixels W2I performed in the images I11 to I13.

Next, a calculation process performed in Step S55 for calculating the amount of movement of the workpiece W2 relative to the camera 101 will be specifically described. The lag computation portion 203 calculates the amount of movement $V_{11}$ of the workpiece W2 relative to the camera 101 and performed in a period of time from the time $t_1$ to the time $t_2$, by using the image I11 and the image I12. In addition, the lag computation portion 203 calculates the amount of movement $V_{12}$ of the workpiece W2 relative to the camera 101 and performed in a period of time from the time $t_2$ to the time $t_3$, by using the image I12 and the image I13. The amount of movement $V_{11}$ and $V_{12}$ is a vector or a matrix, and may be a six-dimensional vector. The six-dimensional vector represents a three-dimensional translational movement and a three-dimensional rotational movement.

Next, in Step S56, the lag computation portion 203 calculates a movement of the camera 102 from the images I21 to I23. Since the workpiece W2 moves relative to the camera 102 when viewed from the camera 102, pixels W2I that correspond to the workpiece W2 move in the images I21 to I23. Thus, in Step S56, the lag computation portion 203 calculates the amount of movement of the workpiece W2 relative to the camera 102, as the movement of the camera 102, from the movement of the pixels W2I performed in the images I21 to I23.

Next, a calculation process performed in Step S56 for calculating the amount of movement of the workpiece W2 relative to the camera 102 will be specifically described. The lag computation portion 203 calculates the amount of movement $V_{21}$ of the workpiece W2 relative to the camera 102 and performed in a period of time from the time $t_1+S$ to the time $t_2+\delta$, by using the image I21 and the image I22. In addition, the lag computation portion 203 calculates the amount of movement $V_{22}$ of the workpiece W2 relative to the camera 102 and performed in a period of time from the time $t_2+\delta$ to the time $t_3+\delta$, by using the image I22 and the image I23. The amount of movement $V_{21}$ and $V_{22}$ is a vector or a matrix, and may be a six-dimensional vector. The six-dimensional vector represents a three-dimensional translational movement and a three-dimensional rotational movement.

In the above-described steps S55 and S56, the lag computation portion 203 calculates the amount of movement $V_{11}$ and $V_{12}$ of the workpiece W2 relative to the camera 101, and the amount of movement $V_{21}$ and $V_{22}$ of the workpiece W2 relative to the camera 102, based on the image groups I1 and I2 acquired from the cameras 101 and 102.

For calculating the above-described movement of the cameras 101 and 102, the optical flow may be used. The optical flow is expressed as vectors that represent movements of portions of an object, performed in images that have been successively captured. The optical flow can be calculated by using the Lucas-Kanade method, for example. By using the optical flow of part or all of the images, the movement of the cameras 101 and 102 can be calculated.

By the way, since the amount of movement $V_{21}$ and $V_{22}$ calculated in this manner is the movement of the camera 102, the coordinate system for the movement of the camera 102 is transformed into the coordinate system for the movement of the camera 101, for comparing the movement of the camera 102 with the movement of the camera 101. For example, stereo camera calibration is performed for obtaining a transformation matrix that translates the coordinate system of the camera 102 to the coordinate system of the camera 101, and the transformation matrix is prestored in the ROM 1602. The lag computation portion 203 uses the transformation matrix, and transforms the amount of movement $V_{21}$ and $V_{22}$ of the workpiece W2 relative to the camera 102, to the amount of movement $V'_{11}$ and $V'_{12}$ of the workpiece W2 relative to the camera 101. If the posture of the camera 101 is the same as that of the camera 102, and the position of the camera 101 is nearly the same as that of the camera 102 as in a small parallel stereo camera, the transformation process may be omitted.

In Step S57, the lag computation portion 203 calculates the lag $\delta$ between the image capture timings of the cameras 101 and 102, by using the amount of movement $V_{11}$, $V_{12}$, $V'_{11}$, and $V'_{12}$. Hereinafter, one example of calculating the lag $\delta$ will be described.

Figure 8A:
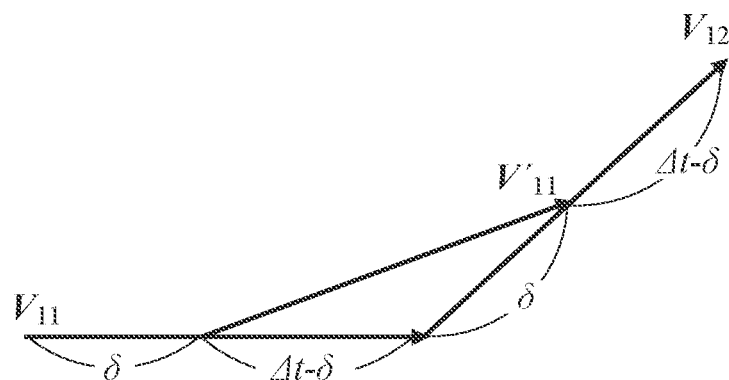
FIG. 8A is a schematic diagram illustrating a detection process of the first embodiment.
Figure 8B:
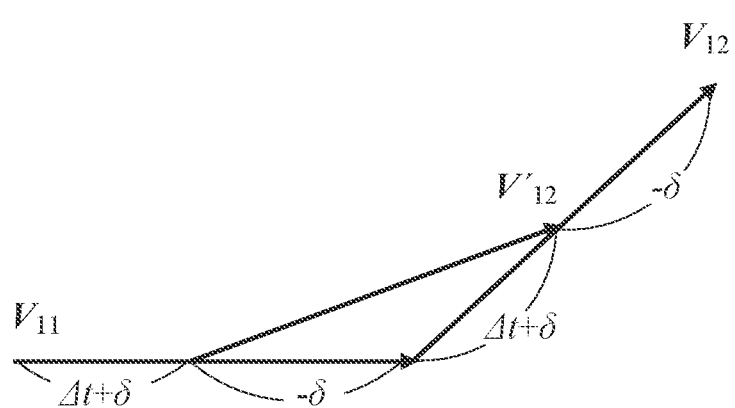
FIG. 8B is a schematic diagram illustrating a detection process of the first embodiment.
Figure 8C:
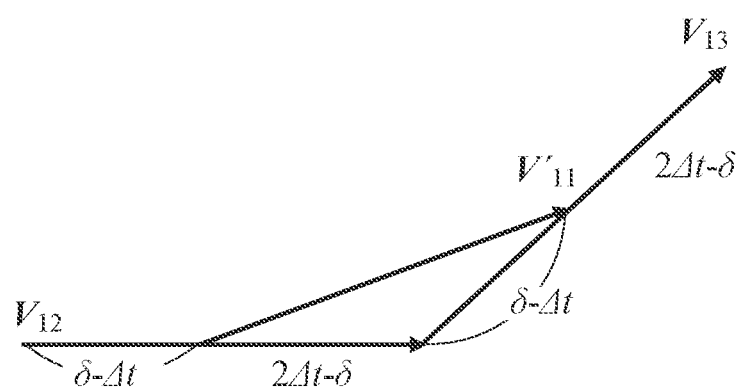
FIG. 8C is a schematic diagram illustrating a detection process of the first embodiment.

FIGS. 8A to 8C are schematic diagrams each illustrating a detection process of the first embodiment. FIG. 8A is a schematic diagram illustrating a relationship between the amount of movement $V_{11}$, $V_{12}$, and $V'_{11}$, obtained when the lag $\delta$ satisfies $0 \leq \delta < \Delta t$. FIG. 8B is a schematic diagram illustrating a relationship between the amount of movement $V_{11}$, $V_{12}$, and $V'_{12}$, obtained when the lag $\delta$ satisfies $-\Delta t < \delta \leq 0$.

The relationship that holds can be determined by performing the following calculation. Hereinafter, the description will be made for a case where $-\Delta t < \delta < \Delta t$.

In the movement of the camera 101 performed in a period of time from the time $t_1$ to the time $t_3$, if $t_2-t_1$ and $t_3-t_2$ are sufficiently small, the movement of the camera 101 performed in a period of time from $t_2$ to $t_1$ and in a period of time from $t_3$ to $t_2$, that is, the amount of movement of the workpiece W2 relative to the camera 101 can be approximated with a straight line.

Thus, if $0 \leq \delta < \Delta t$ is satisfied, the amount of movement $V'_{11}$ is expressed by the following equation (1), by using the amount of movement $V_{11}$, the amount of movement $V_{12}$, the lag $\delta$, and the image capture intervals $\Delta t$.

$$V'_{11} = V_{11} + (V_{12} - V_{11})\frac{\delta}{\Delta t} \quad (1)$$

If $-\Delta t < \delta \leq 0$ is satisfied, the amount of movement $V'_{12}$ is expressed by the following equation (2).

$$V'_{12} = V_{12} + (V_{12} - V_{11})\frac{\delta}{\Delta t} \quad (2)$$

The lag computation portion 203 first solves one of the equation (1) and the equation (2) for determining $\delta$. The lag computation portion 203 outputs the value of $\delta$ if the solution is obtained, or solves the other equation and determines $\delta$ if the solution is not obtained. The parameter $\Delta t$ used for the equations (1) and (2) is a constant prestored in a storage portion, such as the ROM 1602. The parameter $\Delta t$ used for the equations (1) and (2) corresponds to the above-described reference interval. For example, the parameter $\Delta t$ is a constant that is set at 3 [ms].

As described above, if $-\Delta t < \delta < \Delta t$ is satisfied, the lag $\delta$ can be determined by solving the above-described equation (1) or (2). In this process, since the movement of the camera 101 is linearly approximated, an approximation error occurs.

However, the approximation error decreases as the lag δ decreases through the synchronization performed in accordance with the lag δ, which is calculated as described above.

Note that if δ=0, both of the equations (1) and (2) hold. That is, if δ=0, the amount of movement $V_{11}$ equals the amount of movement $V'_{11}$, and the amount of movement $V_{12}$ equals the amount of movement $V'_{12}$.

If the absolute value of the lag δ exceeds Δt, the lag computation portion 203 acquires four or more images, as the predetermined number of images, in Step S54. Note that since whether the absolute value of the lag δ exceeds Δt cannot be determined when the lag computation portion 203 acquires images, the predetermined number of images is estimated in advance. By selecting a movement whose timing is appropriately taken, a relationship similar to the relationship illustrated in FIG. 8A or 8B can be obtained. FIG. 8C is a schematic diagram illustrating an example obtained when the lag δ satisfies Δt≤δ<2Δt. In this case, the lag computation portion 203 acquires four images from the camera 101 in Step S54. Then the lag computation portion 203 determines the amount of movement $V_{13}$ of the camera 101, performed in a period of time from the time $t_3$ to a time $t_3+\Delta t$. Then, the lag δ illustrated in FIG. 8A is replaced with δ−Δt illustrated in FIG. 8C. As a result, the relationship between the amount of movement $V_{12}$, $V_{13}$, and $V'_{11}$ of the workpiece W2 relative to the camera 101 becomes equal to the relationship illustrated in FIG. 8A. Thus, the lag computation portion 203 replaces δ with δ−Δt, $V_{11}$ with $V_{12}$, and $V_{12}$ with $V_{13}$, and thereby can solve the equation (1) for determining δ. In this manner, the predetermined number used in Step S54 is set in advance in accordance with an estimated range of the lag S, so that a relationship similar to any one of the relationships illustrated in FIGS. 8A to 8C can be obtained.

The above description has been made for the case where the lag computation portion 203 acquires three images from each of the cameras 101 and 102, and for the case where the lag computation portion 203 acquires four images from each of the cameras 101 and 102. However, the present disclosure is not limited to this. For example, the lag computation portion 203 may acquire five or more images from each of the cameras 101 and 102. In addition, the lag computation portion 203 may calculate the lag δ from a plurality of relational expressions of motion, which are obtained from the images.

In addition, although the description has been made for the case where the image capture device 1 is moved in the work space R1, the present disclosure is not limited to this. For example, the workpiece W2 whose images are captured may be moved in the work space R1, or both of the image capture device 1 and the workpiece W2 may be moved in the work space R1. For example, the image capture device 1 may be fixed to a frame (not illustrated) so as not to move in the work space R1. In this case, the workpiece W2 whose images are captured is moved in the work space R1. For example, a driving device such as the robot device 1001 may support the workpiece W2, and moves the workpiece W2 with respect to the image capture device 1. Also in this case, the driving device may move the workpiece W2 nonlinearly with respect to the image capture device 1.

The object whose images are captured is not limited to the workpiece W2, and may be any object as long as the amount of movement of the object can be determined from images of the object. In any case, the object has only to move relative to the plurality of cameras 101 and 102.

As described above, in Step S57, the lag computation portion 203 detects the lag δ between the image capture timings of the cameras 101 and 102, by using the amount of movement of the workpiece W2 relative to the cameras 101 and 102. Thus, the lag computation portion 203 can accurately detect the lag δ between the image capture timings of the cameras 101 and 102, by using images captured by the cameras 101 and 102.

Figure 9:
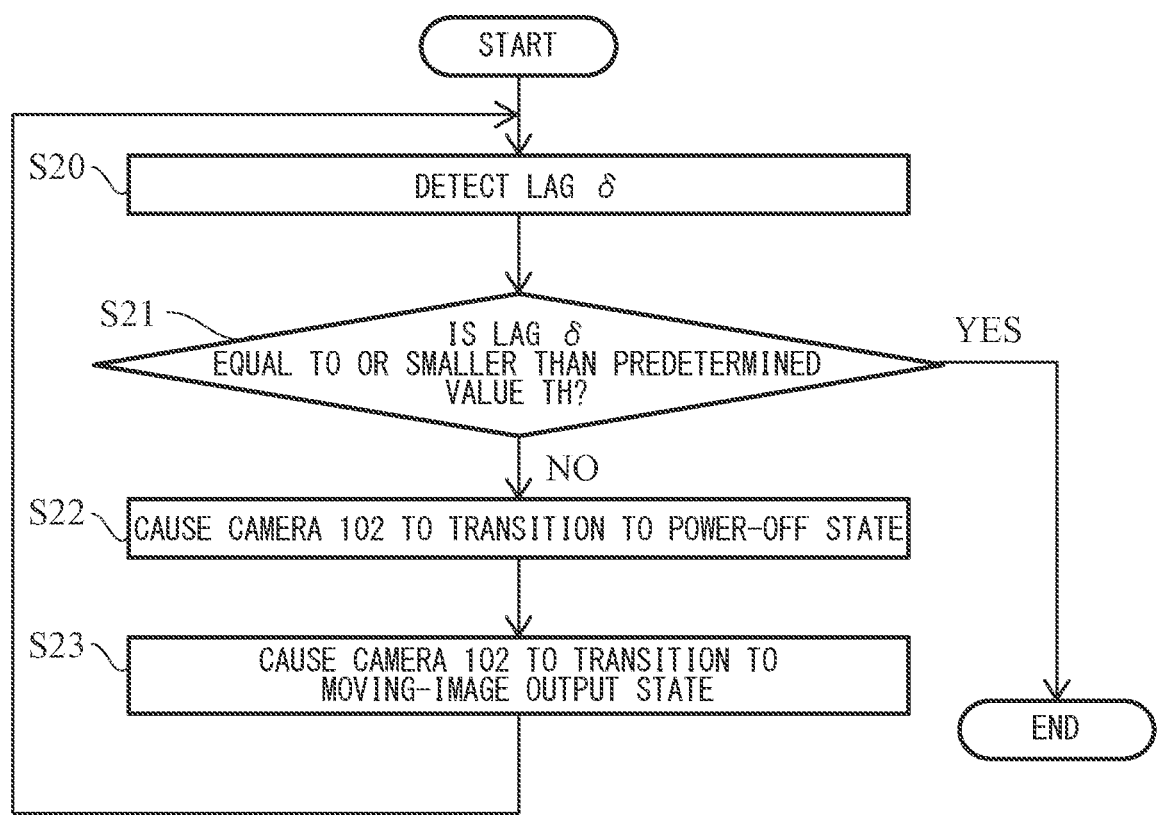
FIG. 9 is a flowchart illustrating a procedure of a synchronizing process included in the information processing method of the first embodiment.

Next, the synchronizing process will be described. FIG. 9 is a flowchart illustrating a procedure of the synchronizing process included in the information processing method of the first embodiment.

The processing portion 200 performs the synchronizing process illustrated in FIG. 9. Thus, the synchronizing process is performed by the processing portion 200 illustrated in FIG. 2, that is, by the synchronization control portion 204.

In Step S20, the synchronization control portion 204 sends an instruction to the lag computation portion 203, and causes the lag computation portion 203 to perform the detection process that detects the lag δ.

In Step S21, the synchronization control portion 204 determines whether the lag δ is equal to or smaller than a predetermined value TH.

If the lag δ is equal to or smaller than the predetermined value TH (Step S21: YES), then the synchronization control portion 204 ends the synchronizing process. After that, the three-dimensional-measurement portion 205 performs three-dimensional measurement.

In the present embodiment, the three-dimensional-measurement portion 205 performs the three-dimensional measurement of the workpiece W2 by causing the plurality of cameras 101 and 102 to capture the images of the workpiece W2. Then the three-dimensional-measurement portion 205 transmits a measurement result to the control device 1002. The control device 1002 causes the robot device 1001 to assemble the workpiece W1 to the workpiece W2 by moving the robot device 1001 depending on the measurement result, and thereby manufactures a product that is an assembly constituted by the workpiece W1 and the workpiece W2.

On the other hand, if the lag δ is larger than the predetermined value TH (Step S21: NO), then the synchronization control portion 204 proceeds to the next step S22.

In Step S22, the synchronization control portion 204 sends an instruction to the camera control portion 201 for causing the image sensor 302 of the camera 102 to transition to the power-off state 401. With this operation, the camera control portion 201 sends an instruction to the camera 102, and causes the image sensor 302 of the camera 102 to transitions to the power-off state 401. As a result, the camera 102 stops outputting moving images.

In Step S23, the synchronization control portion 204 causes the image sensor 302 of the camera 102 to transition to the moving-image output state 404. Specifically, the synchronization control portion 204 sends an instruction to the camera control portion 201 for causing the image sensor 302 of the camera 102 to transition from the power-off state 401 to the moving-image output state 404 through the initialization state 402 and the image-capture-parameter adjustment state 403. With this operation, the camera control portion 201 sends an instruction to the camera 102, and causes the image sensor 302 of the camera 102 to transition from the power-off state 401 to the moving-image output state 404 through the initialization state 402 and the image-capture-parameter adjustment state 403. Then, the synchronization control portion 204 proceeds to Step S20. The synchronization control portion 204 repeats the loop process of the steps S20 to S23 until the lag δ becomes equal to or smaller than the predetermined value TH. When the synchronization control portion 204 performs the above-described loop process several times, the lag δ becomes equal to or smaller than the predetermined value TH. Preferably, the synchronizing process is performed in a period of time in which the measurement process, which is performed by the three-dimensional-measurement portion 205 by using the image capture device 1, is not performed. Thus, the time taken for the three-dimensional measurement is not extended.

As described above, if the lag δ exceeds the predetermined value TH, the processing portion 200 repeats the loop process, in which the image capture timing of the camera 102 is reset and the detection process of Step S20 is executed again, until the lag δ becomes equal to or smaller than the predetermined value TH. In the present embodiment, since the image capture timings are set depending on the moving-image output start timing as described above, the processing portion 200 resets the moving-image output start timing. In the loop process performed after the image capture timings of the camera 102 are reset, a new image group, which is different from the image group acquired before the image capture timings of the camera 102 is reset, is acquired (in the steps S52 to S54) at new image capture timings, which are different from the image capture timings of the camera 102 used in the detection process performed before the image capture timings are reset. The processing portion 200 performs Step S56 again, and calculates the new amount of movement from the new image group. Then the processing portion 200 performs Step S57 again, and calculates a new lag δ.

Note that although the description has been made, in the present embodiment, for the case where the image capture timings of the camera 102 are reset, the present disclosure is not limited to this. The processing portion 200 has only to reset the image capture timings of at least one of the plurality of cameras 101 and 102. Thus, the image processing portion 200 may reset the image capture timings of the camera 101, or may reset the image capture timings of both of the cameras 101 and 102.

In addition, the method of resetting the image capture timings of the camera is not limited to turning on and off the power supplied to the image sensor 302. Thus, the method may be any method employed in accordance with the specifications of the camera 102, as described above.

As described above, in the first embodiment, the cameras 101 and 102 can be synchronized with each other through the detection process and the synchronizing process.

Second Embodiment

Figure 10:
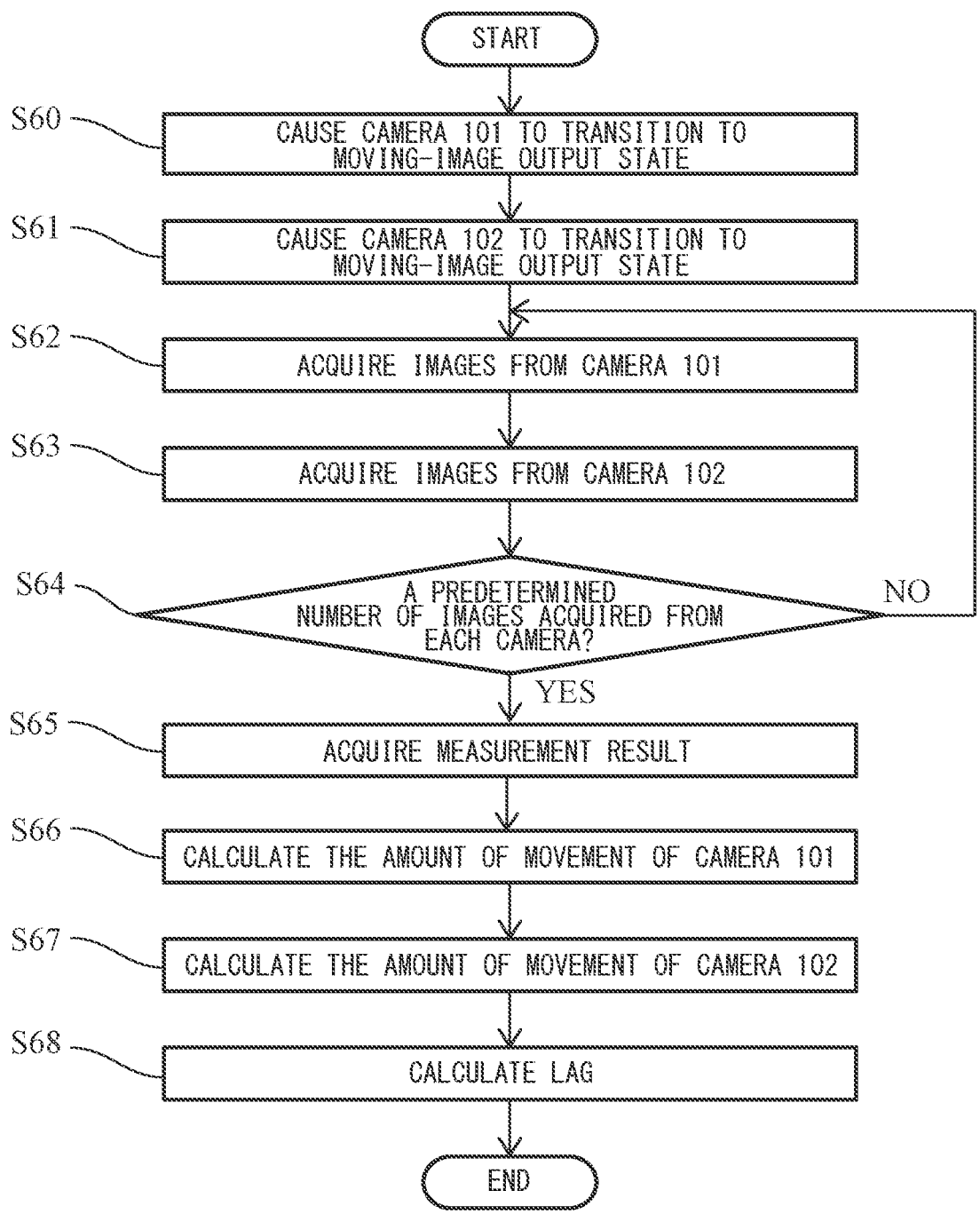
FIG. 10 is a flowchart illustrating a procedure of a detection process included in an information processing method of a second embodiment.

Next, a second embodiment will be described. FIG. 10 is a flowchart illustrating a procedure of a detection process included in an information processing method of the second embodiment. Since the hardware configuration of the second embodiment is the same as that of the first embodiment, the detailed description thereof will be omitted, and the following description will be made, referring as necessary to the drawings used in the description of the first embodiment.

The processing portion 200 illustrated in FIG. 2A performs a detection process in which the lag between the image capture timings of the plurality of cameras 101 and 102 is detected. That is, the lag detection process is performed by the processing portion 200, that is, by the lag computation portion 203. The below-described object whose images are captured by the cameras 101 and 102 may be any object as long as features of the object can be extracted from the images. In the present embodiment, the object is the workpiece W2 which is illustrated in FIG. 1A, and on which the three-dimensional measurement is performed. The workpiece W2 does not move in the work space R1 in a period of time in which images of the workpiece W2 are captured by the image capture device 1 for detecting the lag. The image capture device 1 is moved along the nonlinear line C1, with respect to the workpiece W2.

As illustrated in FIG. 1A, in the present embodiment, the image capture device 1 is supported by the robot hand 1020. Thus, the image capture device 1 moves together with the robot hand 1020. Thus, the movement of the image capture device 1 can be measured by the control device 1002. In the present embodiment, the control device 1002 functions as a measurement portion.

The control device 1002 has a function that measures the amount of movement of the image capture device 1 at intervals shorter than the image capture intervals Δt of the cameras 101 and 102. Thus, the control device 1002 can transmit measurement results to the image processing device 2 at intervals shorter than the image capture intervals Δt.

One specific example will be described. The control device 1002 can calculate the position and posture of the robot hand 1020 with respect to a predetermined coordinate system, by performing calculation based on forward kinematics of robot. The predetermined coordinate system may be a robot coordinate system whose origin is set at a base portion of the robot device 1001. The position and posture of the camera 101 of the image capture device 1 relative to the robot hand 1020 and the position and posture of the workpiece W2 with respect to the predetermined coordinate system are determined in advance. Thus, the control device 1002 can determine a position and a posture of the workpiece W2 relative to the camera 101 of the image capture device 1, associating the position and the posture of the workpiece W2 with a time at which the position and the posture of the workpiece W2 are obtained.

Hereinafter, processes performed by the control device 1002 and the image processing device 2 will be described with reference to the flowchart of FIG. 10.

In Step S60, the lag computation portion 203 causes the image sensor 302 of the camera 101 to transition to the moving-image output state 404, as in Step S50. In Step S61, the lag computation portion 203 causes the image sensor 302 of the camera 102 to transition to the moving-image output state 404, as in Step S51. In Step S62, the lag computation portion 203 acquires images captured by the camera 101, as in Step S52. In Step S63, the lag computation portion 203 acquires images captured by the camera 102, as in Step S53.

In Step S64, the lag computation portion 203 determines whether to acquire a predetermined number of images (i.e., still images) from each of the cameras 101 and 102. If the lag computation portion 203 has not acquired the predetermined number of images (S64: NO), then the lag computation portion 203 returns to Step S62. In this manner, the lag computation portion 203 repeats the steps S62 and S63 until the lag computation portion 203 acquires the predetermined number of images. In the second embodiment, the predetermined number of images acquired by the lag computation portion 203 from each of the cameras 101 and 102 is at least two.

Hereinafter, the steps S62 to S64 will be described with reference to FIG. 7, for a case where the predetermined number of images acquired by the lag computation portion 203 from each of the cameras 101 and 102 is two. In the second embodiment, images I11 and I12 are acquired in this order from the camera 101. The plurality of images I11 and I12 constitute an image group I1. In addition, images I21 and I22 are acquired in this order from the camera 102. The plurality of images I21 and I22 constitute an image group I2. The images I11 and I12 are successively acquired in time series at an image capture interval Δt [ms], from moving-image data outputted from the camera 101. The images I21 and I22 are successively acquired in time series at an image capture interval Δt [ms], from moving-image data outputted from the camera 102. The images I11 and I12 are respectively captured at different image capture times $t_1$ and $t_2$. Similarly, the images I21 and I22 are respectively captured at different image capture times $t_1+\delta$ and $t_2+\delta$.

As described above, in the steps S60 to S64, the lag computation portion 203 acquires the image group I1 from the camera 101. The image group I1 is produced by the camera 101 capturing images of the workpiece W2, which moves relative to the camera 101, at the image capture interval Δt. Similarly, in the steps S60 to S64, the lag computation portion 203 acquires the image group I2 from the camera 102. The image group I2 is produced by the camera 102 capturing images of the workpiece W2, which moves relative to the camera 102, at the image capture interval Δt.

In Step S65, the lag computation portion 203 acquires a movement M of the camera 101 measured by the control device 1002 and performed in a period of time from a time immediately before Step S62 to the end of Step S64. As described above, the movement M of the camera 101 is measured by the control device 1002; and corresponds to the position and posture of the workpiece W2 relative to the camera 101, which are associated by the control device 1002 with the time at which the position and the posture of the workpiece W2 are determined.

In the present embodiment, the movement M is a movement in which a velocity of the camera 101 uniquely determines a corresponding time at which the velocity is produced. Such a movement can be produced by moving the camera 101 along an arc trajectory, for example.

In Step S66, the lag computation portion 203 calculates the amount of movement $V_{11}$ of the workpiece W2 relative to the camera 101 and performed in a period of time from the time $t_1$ to the time $t_2$, by using the image I11 and the image I12. The amount of movement $V_{11}$ is a vector or a matrix, and may be a six-dimensional vector. The six-dimensional vector represents a three-dimensional translational movement and a three-dimensional rotational movement.

In Step S67, the lag computation portion 203 calculates the amount of movement $V_{21}$ of the workpiece W2 relative to the camera 102 and performed in a period of time from the time $t_1+\delta$ to the time $t_2+\delta$, by using the image I21 and the image I22. The amount of movement $V_{21}$ is a vector or a matrix, and may be a six-dimensional vector. The six-dimensional vector represents a three-dimensional translational movement and a three-dimensional rotational movement.

In the above-described steps S66 and S67, the lag computation portion 203 calculates the amount of movement $V_{11}$ of the workpiece W2 relative to the camera 101, and the amount of movement $V_{21}$ of the workpiece W2 relative to the camera 102, based on the image groups I1 and I2 acquired from the cameras 101 and 102.

For calculating the above-described movement of the cameras 101 and 102, the optical flow may be used. The optical flow is expressed as vectors that represent movements of portions of an object, performed in images that have been successively captured. The optical flow can be calculated by using the Lucas-Kanade method, for example. By using the optical flow of part or all of the images, the movement of the cameras 101 and 102 can be calculated.

By the way, since the amount of movement $V_{21}$ calculated in this manner is the movement of the camera 102, the coordinate system for the movement of the camera 102 is transformed into the coordinate system for the movement of the camera 101, for comparing the movement of the camera 102 with the movement of the camera 101. For example, stereo camera calibration is performed for obtaining a transformation matrix that translates the coordinate system of the camera 102 to the coordinate system of the camera 101, and the transformation matrix is prestored in the ROM 1602. The lag computation portion 203 uses the transformation matrix, and transforms the amount of movement $V_{21}$ of the workpiece W2 relative to the camera 102, to the amount of movement $V'_{11}$ of the workpiece W2 relative to the camera 101. If the posture of the camera 101 is the same as that of the camera 102, and the position of the camera 101 is nearly the same as that of the camera 102 as in a small parallel stereo camera, the transformation process may be omitted.

In Step S68, the lag computation portion 203 calculates the lag δ between the image capture timings of the cameras 101 and 102, by using the amount of movement $V_{11}$ and $V'_{11}$, and a measurement result obtained by the control device 1002.

Figure 11:
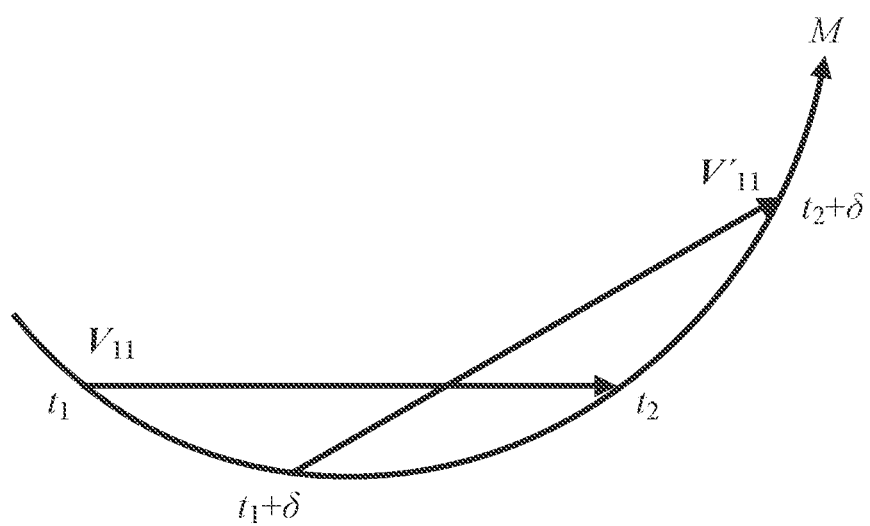
FIG. 11 is a schematic diagram illustrating the detection process of the second embodiment.

FIG. 11 is a schematic diagram illustrating a detection process of the second embodiment. FIG. 11 illustrates a relationship between the amount of movement $V_{11}$, the amount of movement $V'_{11}$, and the movement M. The movement M of the camera 101 is measured at intervals shorter than the image capture intervals at which the amount of movement $V_{11}$ and $V'_{11}$ is determined. Thus, the lag computation portion 203 compares the amount of movement $V_{11}$ and $V'_{11}$, with the movement M; and thereby determines the time $t_1$ and the time $t_1+\delta$, in units, each of which corresponds to one of the intervals at which the movement M of the camera 101 is measured.

Hereinafter, the description thereof will be specifically made. The amount of movement $V_{11}$ is a vector. The lag computation portion 203 performs a search process, and searches for a start point and an end point of the amount of movement $V_{11}$ that are located on the movement M. FIG. 11 illustrates a result of the search. The start point of the amount of movement $V_{11}$ located on the movement M corresponds to the time $t_1$. Thus, by performing the search process for searching for the start point and the end point of the amount of movement $V_{11}$ that are located on the movement M, the lag computation portion 203 determines the time $t_1$ at which the image I11 was captured. Similarly, by performing the search process for searching for the start point and the end point of the amount of movement $V'_{11}$ that are located on the movement M, the lag computation portion 203 determines the time $t_1+\delta$ at which the image I11 was captured. Then, the lag computation portion 203 determines the lag δ between the image capture timings of the cameras 101 and 102, from the difference between the time $t_1+\delta$ and the time $t_1$.

Thus, in the second embodiment, the lag computation portion 203 can detect the lag δ between the image capture timings of the cameras 101 and 102, more accurately than in the first embodiment in which the lag δ is determined through the linear approximation, by using images captured by the cameras 101 and 102 and the measurement result of the movement M of the camera 101.

Since the synchronizing process of the second embodiment is the same as that of the first embodiment, the description thereof will be omitted. In the second embodiment, the cameras 101 and 102 can be synchronized with each other through the detection process and the synchronizing process.

Note that although the description has been made, in the second embodiment, for the case where the movement of the image capture device 1 is measured by the control device 1002, the present disclosure is not limited to this. For example, the movement of the image capture device 1 may be measured by an external sensor (not illustrated). In this case, the external sensor (not illustrated) and the image processing device 2 may be communicatively connected with each other via wire or wirelessly.

The present invention is not limited to the above-described embodiments, and may be variously modified within the technical concept of the present invention. In addition, the effects described in the embodiments are merely the most suitable effects produced by the present invention. Thus, the effects by the present invention are not limited to those described in the embodiments.

In the above-described embodiments, the description has been made for the case where the robot arm 1010 is a vertically articulated robot arm. However, the present disclosure is not limited to this. For example, the robot arm may be any one of various robot arms, such as a horizontally articulated robot arm, a parallel link robot arm, and a Cartesian coordinate robot arm.

In the above-described embodiments, the description has been made for the case where the image capture device 1 is attached to the robot hand 1020 of the robot device 1001. However, the present disclosure is not limited to this. For example, the image capture device may be attached to any driving device that can automatically perform expansion and contraction motion, bending and stretching motion, up-and-down motion, right-and-left motion, pivot motion, or combination motion thereof, depending on information data stored in the storage device of the control device.

In addition, in the above-described embodiments, the description has been made for the case where the plurality of monocular cameras, which capture images synchronously, constitute a stereo camera used for three-dimensional measurement. However, the hardware configuration and the image capture control of the present invention may be used in an image capture system that includes a plurality of monocular cameras, and that captures images synchronously for some purpose. For example, images are captured synchronously by a plurality of cameras when a three-dimensional video, such as a free viewpoint video, is produced. Thus, when such a three-dimensional video is produced, any one of the above-described embodiments can be used for detecting the lag in synchronization and for effectively improving the quality of the video that is produced from images captured synchronously. In addition, when images are captured synchronously by a plurality of cameras of an image capture apparatus such as a smart phone, any one of the above-described embodiments can be used for detecting the lag in synchronization and for effectively improving the quality of the video that is produced from images captured synchronously. In addition, if any one of the above-described embodiments is used for a monitoring system that uses a plurality of monitoring cameras, the plurality of monitoring cameras can be easily synchronized.

In the above-described embodiments, the description has been made for the case where the image capture device 1 has two cameras 101 and 102. However, the present disclosure is not limited to this. For example, the image capture device 1 may have three or more cameras.

In the above-described embodiments, the description has been made for the case where the object on which the three-dimensional measurement is performed, that is, the object which is controlled is the workpiece W2 to which the workpiece W1 is assembled. However, the present disclosure is not limited to this. For example, the object on which the three-dimensional measurement is performed may be the workpiece W1. In this case, the workpiece W1 is the object which is controlled, and the three-dimensional measurement may be performed on the workpiece W1 when the workpiece W1 is held by the robot hand 1020.

In the above-described embodiments, the three-dimensional measurement is performed on the workpiece when assembly work is performed. However, the present disclosure is not limited to this. For example, the three-dimensional measurement may be performed on the workpiece, which is an object that is controlled, in one of various types of work, such as cutting the workpiece, grinding the workpiece, polishing the workpiece, and applying paint onto the workpiece. In this case, the end effector may be a robot hand, or may be a tool that is properly used for work.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-124856, filed Jul. 22, 2020, which is hereby incorporated by reference herein in its entirety.

What is claimed is:

1. A system comprising an information processing device, the information processing device being configured to:
acquire a first image group from a first camera of a plurality of cameras, the first image group including at least three first images of an object that moves relative to the plurality of cameras, the at least three first images being captured by the first camera at predetermined intervals and having different image capture times;

acquire a second image group from a second camera of the plurality of cameras, the second image group including at least two second images of the object that moves relative to the plurality of cameras, the at least two second images being captured by the second camera at the predetermined intervals and having different image capture times;

calculate two first amounts of movement of the object between the at least three first images;

calculate a second amount of movement of the object between the at least two second images; and detect a lag between image capture timings of the first camera and the second camera, by using a relationship between the two first amounts of movement, the second amount of movement, and the predetermined intervals.

2. A system comprising an information processing device, the information processing device being configured to:

acquire an image group from each of a plurality of cameras, the image group including a plurality of images of an object that moves relative to each of the plurality of cameras, the plurality of images being captured by a corresponding camera at predetermined intervals and having different image capture times;

calculate an amount of movement of the object relative to each of the plurality of cameras, based on the image group acquired from each of the plurality of cameras;

detect a lag between image capture timings of the plurality of cameras, by using the amount of movement of the object relative to each of the plurality of cameras;

reset an image capture timing of at least one of the plurality of cameras if the lag exceeds a predetermined value;

acquire a new image group from each of the plurality of cameras, the new image group including a plurality of images of the object that moves relative to each of the plurality of cameras, the plurality of images being captured by a corresponding camera at the predetermined intervals and having different image capture times;

calculate a new amount of movement of the object relative to each of the plurality of cameras, based on the new image group acquired from each of the plurality of cameras; and detect a new lag between image capture timings of the plurality of cameras, by using the new amount of movement of the object relative to each of the plurality of cameras, for causing the new lag to become equal to or smaller than the predetermined value.

3. The system according to claim 2, wherein the information processing device is configured to calculate the amount of movement of the object relative to each of the plurality of cameras, by using at least three images of the plurality of images of the image group acquired from each of the plurality of cameras.

4. A system comprising:
an information processing device; and
a measurement portion configured to measure a position and a posture of an object with a corresponding time, wherein the information processing device is configured to (1) acquire a first image group from a first camera of a plurality of cameras, the first image group including at least two first images of the object that moves relative to the plurality of cameras, the at least two first images being captured by the first camera at predetermined intervals and having different image capture times, (2) acquire a second image group from a second camera of the plurality of cameras, the second image group including at least two second images of the object that moves relative to the plurality of cameras, the at least two second images being captured by the second camera at the predetermined intervals and having different image capture times, (3) calculate a first amount of movement between the at least two first images, (4) calculate a second amount of movement between the at least two second images, and (5) detect a lag between image capture timings of the first camera and the second camera, by using a relationship between the first amount of movement, the second amount of movement, and a measurement result obtained by the measurement portion.

5. The system according to claim 2, further comprising a driving device configured to support and move one of the object and the plurality of cameras.

6. The system according to claim 5, wherein the driving device is configured to move one of the object and the plurality of cameras nonlinearly with respect to another when the plurality of cameras capture images of the object.

7. The system according to claim 5, wherein the driving device comprises a robot arm and an end effector attached to the robot arm.

8. The system according to claim 2, wherein the information processing device is configured to control at least one of the plurality of cameras such that the lag between the image capture timings of the plurality of cameras is decreased.

9. The system according to claim 2, further comprising a communication interface via which the plurality of cameras and the information processing device communicate with each other.

10. The system according to claim 2, further comprising the plurality of cameras.

11. An information processing method performed by a processing portion that performs information processing, the method comprising:

acquiring, by the processing portion, an image group from each of a plurality of cameras, the image group including a plurality of images of an object that moves relative to each of the plurality of cameras, the plurality of images being captured by a corresponding camera at predetermined intervals and having different image capture times;

calculating, by the processing portion, an amount of movement of the object relative to each of the plurality of cameras, based on the image group acquired from each of the plurality of cameras;

detecting, by the processing portion, a lag between image capture timings of the plurality of cameras, by using the amount of movement of the object relative to each of the plurality of cameras;

resetting, by the processing portion, an image capture timing of at least one of the plurality of cameras if the lag exceeds a predetermined value;

acquiring, by the processing portion, a new image group from each of the plurality of cameras, the new image group including a plurality of images of the object that moves relative to each of the plurality of cameras, the plurality of images being captured by a corresponding camera at the predetermined intervals and having different image capture times;

calculating, by the processing portion, a new amount of movement of the object relative to each of the plurality of cameras, based on the new image group acquired from each of the plurality of cameras; and detecting, by the processing portion, a new lag between image capture timings of the plurality of cameras, by using the new amount of movement of the object relative to each of the plurality of cameras, for causing the new lag to become equal to or smaller than the predetermined value.

12. The information processing method according to claim 11, wherein the processing portion is configured to reset image capture timings of at least one of the plurality of cameras such that a lag between image capture timings of the plurality of cameras is decreased.

13. The information processing method according to claim 11, wherein the processing portion is configured to determine the amount of movement of the object relative to each of the plurality of cameras, by using at least three images of the plurality of images of the image group acquired from each of the plurality of cameras.

14. The information processing method according to claim 11, further comprising:

measuring a position and a posture of the object relative to at least one of the plurality of cameras; and associating the position and the posture of the object with a corresponding time, wherein the calculating the amount of movement of the object relative to each of the plurality of cameras calculates the amount of movement of the object relative to each of the plurality of cameras by using at least two images of the plurality of images of the image group acquired from each of the plurality of cameras, and wherein the detecting the lag between image capture timings of the plurality of cameras detects the lag between image capture timings of the plurality of cameras by using the amount of movement of the object relative to each of the plurality of cameras and a result of the measurement.

15. The information processing method according to claim 11, further comprising:

acquiring the plurality of images from each of the plurality of cameras by causing the camera to capture images of the object at the predetermined intervals, wherein the object moves nonlinearly relative to the plurality of cameras.

16. A method of manufacturing a product, wherein the method uses a system including (a) an information processing device and (b) a driving device configured to support and move one of an object and a plurality of cameras, the driving device including (a) a robot arm and (b) an end effector attached to the robot arm, wherein the information processing device is configured to (1) acquire an image group from each of the plurality of cameras, the image group including a plurality of images of an object that moves relative to each of the plurality of cameras, the plurality of images being captured by a corresponding camera at predetermined intervals and having different image capture times, (2) calculate an amount of movement of the object relative to each of the plurality of cameras, based on the image group acquired from each of the plurality of cameras, and (3) detect a lag between image capture timings of the plurality of cameras, by using the amount of movement of the object relative to each of the plurality of cameras, and wherein if the lag detected is equal to or smaller than a predetermined value, the method (a) causes the plurality of cameras to capture images of a workpiece, (b) performs three-dimensional measurement on the workpiece, and (c) manufactures a product by controlling the workpiece by using the robot arm and the end effector.

17. A non-transitory computer-readable recording medium storing a program that causes a computer including the processing portion to perform the method according to claim 11.

* * * * *